(12) United States Patent
O'Brien

(10) Patent No.: US 9,591,039 B2
(45) Date of Patent: Mar. 7, 2017

(54) REGION BASED IMAGE SHARING

(71) Applicant: Apple Inc., Cupertino, CA (US)

(72) Inventor: Sean P. O'Brien, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 96 days.

(21) Appl. No.: 14/502,692

(22) Filed: Sep. 30, 2014

(65) Prior Publication Data

US 2015/0350265 A1    Dec. 3, 2015

Related U.S. Application Data

(60) Provisional application No. 62/006,238, filed on Jun. 1, 2014.

(51) Int. Cl.
*H04L 29/06* (2006.01)
*H04L 29/08* (2006.01)
*H04W 4/02* (2009.01)

(52) U.S. Cl.
CPC ........ *H04L 65/403* (2013.01); *H04L 67/1076* (2013.01); *H04L 67/18* (2013.01); *H04L 67/42* (2013.01); *H04W 4/021* (2013.01); *H04L 67/06* (2013.01); *H04L 67/10* (2013.01); *H04L 67/26* (2013.01)

(58) Field of Classification Search
CPC .................................................. H04L 65/403
See application file for complete search history.

(56) References Cited

U.S. PATENT DOCUMENTS

| | | | |
|---|---|---|---|
| 2008/0219589 A1* | 9/2008 | Jung | H04N 1/00068 382/276 |
| 2010/0113072 A1 | 5/2010 | Gibson et al. | |
| 2010/0238483 A1* | 9/2010 | Nelson | G06F 3/1204 358/1.15 |
| 2013/0120592 A1* | 5/2013 | Bednarczyk | H04N 5/765 348/207.1 |
| 2013/0124508 A1* | 5/2013 | Paris | G06F 17/3028 707/723 |

(Continued)

OTHER PUBLICATIONS

Office Action, dated May 9, 2016, received in U.S. Appl. No. 14/502,699, 12 pages.

*Primary Examiner* — Jerry Dennison
(74) *Attorney, Agent, or Firm* — Morgan, Lewis & Bockius LLP

(57) ABSTRACT

Some embodiments provide a region-based method for sharing photos between devices. The method establishes an image-sharing event for a particular region, which in some embodiments is defined in terms of one or more geographic attributes (e.g., a latitude, a longitude, and one or more shape attributes that define a shape about the intersection of the latitude and the longitude). The method then allows devices that enter the particular region to join the image-sharing event, so that (1) the devices can capture and add photos for the event, and (2) they can view and save photos captured by other devices that joined the event. To facilitate the sharing of the photos, the method of some embodiments makes the photos that are captured for the event available for viewing for a period of time after the event has ended. This extra time provides the event participants more time to view and save photos captured for the event.

27 Claims, 25 Drawing Sheets

(56) References Cited

U.S. PATENT DOCUMENTS

2014/0359482 A1\* 12/2014 Sinn ................... G06F 3/048
                                                         715/753
2015/0264144 A1    9/2015 Hewett et al.
2015/0350266 A1\* 12/2015 O'Brien ............. H04L 65/403
                                                         709/204
2016/0173625 A1\*  6/2016 Ruben ................ H04L 67/18
                                                         709/204

\* cited by examiner

REGION BASED IMAGE SHARING

BACKGROUND

In recent years, there has been a dramatic increase in the sale of smartphones and tablets. One reason for this increase is because of the robust computational resources of these mobile devices. With these devices, users can perform a variety of actions that help facilitate many of their daily tasks. For instance, these devices are often used on a daily basis to exchange emails and text messages, participate in audio calls and video conferences, browse the Internet, prepare documents, play games, etc. However, despite the dramatic increase in their use, the potential of these devices has yet to be reached. These devices have immense computational power and often accompany their users through their daily activities. Ideally, new novel uses for these devices should be found to make them even more useful to their users.

BRIEF SUMMARY

Some embodiments provide a region-based method for sharing photos between devices. The method establishes an image-sharing event for a particular region, which in some embodiments is defined in terms of one or more geographic attributes (e.g., a latitude, a longitude, and one or more shape attributes that define a shape about the intersection of the latitude and the longitude). The method then allows devices that enter the particular region to join the image-sharing event, so that (1) the devices can capture and add photos for the event, and (2) they can view and save photos captured by other devices that joined the event. To facilitate the sharing of the photos, the method of some embodiments makes the photos that are captured for the event available for viewing for a period of time after the event has ended. This extra time provides the event participants more time to view and save photos captured for the event.

In some embodiments, a client-server system implements the region-based, image-sharing method. In this system, a set of one or more servers allows each of several devices to organize one or more image-sharing events in which multiple devices can participate. In some of these embodiments, the server set communicates with an image-sharing application that executes on each of these devices to organize events and share photos amongst the devices. The application in some embodiments is part of the operating system of a device, while in other embodiments it is an application that executes on top of the device's operating system. While a client-server model is described below, the image-sharing applications in other embodiments share the photos through other models, such as a peer-to-peer model, as further described below.

When the user requests the creation of an image-sharing event, the image-sharing application presents to a user a set of controls for defining a geographic region for the event. In some embodiments, the set of controls includes (1) a map that displays an area, and (2) a geometry tool that allows the user to draw, move and adjust a shape (e.g., a polygon, a circle, etc.) in order to specify a region on the map. Once the event organizer defines the region for the event, a region definition is sent by the image-sharing application of the organizer's device to the server set. The server set then creates the event for the specified region, and adds it to a data store of events that the server set maintains. In some embodiments, the server set indexes its data store of events based on location data (e.g., based on latitude and longitude data, a hash of this data, etc.).

In some embodiments, the server set or the organizer's image-sharing application requires the organizer's device to be within the event's region while defining the event. In other embodiments, the event organizer's device can define an event for a region from outside of the event's region so long as the organizer's device is within a threshold distance of the region while defining the event. Other embodiments place no geographic restrictions on the organizer's device. However, some of these embodiments require the organizer to show up to the event's region before allowing others to join the event.

In some embodiments, a user joins an image-sharing event as a participant by selecting the event from a list of nearby events that is presented by the image-sharing event application of the user's device. To obtain this list, the image-sharing event application provides to the server set the location (e.g., the latitude and longitude) of the user's device. Based on the supplied location data, the server set searches its events data store and identifies one or more events that are near the supplied location of the user's device.

In some embodiments, the image-sharing application displays the nearby events that it receives from the server set. The application displays the nearby events differently in different embodiments. For instance, in some embodiments, the application displays these events on a map that shows the current location of the device. In other embodiments, the application displays these events in a list of events that also includes events that the application organized before, as well as events that the application joined previously. In this list, the application in some embodiments only presents a previously joined event while the event is active. In other embodiments, the application also displays in this list inactive previously joined events that ended within a specified time period before the time that the list is presented.

When a user selects a nearby event to join from the presented set of events, the image-sharing application in some embodiments displays some data to the user regarding the event. In some embodiments, the application displays the location of the event on a map, plus some additional information about the event, such as the organizer of the event and/or participants at the event. In other embodiments, the image-sharing application displays other data regarding the event.

With the presented data, the application in some embodiments provides an affordance (e.g., a button) for the user to join the selected event. In some embodiments, the user can join the event if his device is within the event's associated region, while in other embodiments, the user can join the event if his device is near or within this region. This is enforced by the photos-sharing application in some embodiments, while it is enforced by the server set in other embodiments. For instance, in some embodiments, the image-sharing application does not allow the user to join the event (e.g., to even invoke the affordance for joining the event), unless the user's device meets the location-criteria for joining the event. In other embodiments, however, the image-sharing application relays the user's request to the server set and the server set allows or denies this request by comparing the location of the user's device with the event's region.

Assuming that the user's device meets the location criteria for joining an event (as determined by the image-sharing application or the server set), the server set in some embodiments adds the user's device as a participating device to the event automatically when the server set gets the user's request to be added as a participant to the event. In other embodiments, however, the server set requires the event organizer to accept the addition of the requesting user or device as a participant, and only adds the user's device to the event upon receiving the event organizer's acceptance of this request.

In addition to selecting a new nearby event to join, the user can select other events that are displayed in the set of events displayed by the image-sharing application. These events include active events that the user previously organized or joined. Also, in some embodiments, these events include inactive events (i.e., events that have ended). Some embodiments, however, allow the user to select only inactive events that ended within a specified time period before the time that the event set is being presented.

Once the user joins a new event, or selects a previously joined or organized event, the user is presented with one or more photos that were captured for the event by devices participating in the event. In some embodiments, these devices include the device of the event organizer as well as the devices of the other participants (i.e., of the non-organizer participants). To add captured photos to the set of photos shared for an event, the method of some embodiments requires the participating devices to capture photos within the region associated with the event. Other embodiments allow photos to be captured for an event at a location that is near the event's region but not necessarily within this region. Still other embodiments allow a participating device to capture photos for an event irrespective of the location of the device at the time of the photo capture; all these embodiments require is that the device join the event while being within the region associated with the event.

Once the image-sharing application presents the set of photos that were captured for an event by the participating devices, the user can view the captured photos and download them for storing in one or more photo libraries of the user's device. The image-sharing application of some embodiments provides a set of controls for allowing one participant to filter the displayed photos to only include photos captured by a set of one or more participants. For instance, in some embodiments, the application allows one participant to select one particular participant from a list of participants, in order to view the photos captured by the particular participant.

In some embodiments, a participating user needs to download photos captured for an event because, even though the user's image-sharing application obtains from the server set a copy of all captured photos of the event, this application only temporarily stores the received, captured photos in its local database. From this database, the application in some embodiments purges photos (e.g., in some embodiments, purges photos for inactive events a particular time period after the event has ended). Accordingly, if a participant likes a captured photo, the participant in these embodiments needs to save the captured photo (e.g., to a local photo library on his device).

In some embodiments, the image-sharing application does not obtain from the server set a copy of all captured photos of the event. For instance, the image-sharing application in some embodiments only gets thumbnail images of the captured photos, while in other embodiments it gets a web-page presentation of the captured photos. In these embodiments, if a participant likes a captured photo, the participant in these embodiments needs to first download the captured photo and then save this photo to a local photo library on his device.

The image-sharing application of some embodiments provides an affordance for capturing photos inline with the display of the photos captured for the event. In some embodiments, this affordance is a user interface (UI) item (e.g., a button) (1) that is displayed on a page that displays the captured photos of the event, and (2) that is used for starting a camera modality (e.g., opening a camera application) for taking a photo for the event. For instance, the UI item in some embodiments appears at the bottom of a scrollable page that displays the captured photos. In other embodiments, the UI item appears as a floating control or as part of the UI's chrome that is placed over the scrollable photo page.

Once the user selects the camera UI item and places the image-sharing application in its camera modality, the user can just take one photo for the event in some embodiments, while the user can take one or more photos for the event in other embodiments. In some embodiments, the image-sharing application provides an affordance that allows the user to specify whether a captured photo should be added to the set of photos captured for the event by the devices participating in the event. For instance, after each photo is captured, some embodiments provide two controls, one for discarding the captured photo and another for accepting the captured photos to be added to the set of photos for the event. Other embodiments, however, allow the user to capture multiple photos sequentially, and then either (1) to individually discard or add the captured photos to the event, or (2) to concurrently select multiple captured photos for discarding or for adding to the event.

Once the user approves a captured image for an event, the image-sharing application automatically distributes this captured image to other devices that are participating in the event without any other user intervention. In some embodiments, this distribution entails forwarding the captured photo to the server set, which then forwards this captured photo to the other devices participating in the event.

An image-sharing event can be terminated in some embodiments. Different embodiments terminate an image-sharing event differently. For instance, in some embodiments, the event organizer can terminate an event explicitly or implicitly (e.g., by leaving the region of the event). Conjunctively, or alternatively, the image-sharing method of some embodiments terminates an event after a particular duration of time. In some of these embodiments, the event organizer specifies the duration of the event at the time the event is organized.

In the above description, several client-server systems for implementing the image-sharing method of some embodiments are described. However, one of ordinary skill will realize that the image-sharing method of some embodiments is not implemented with a client-server architecture. For instance, the method of some embodiments is implemented with a peer-to-peer model, in which the participating devices communicate directly with each other to distribute the photos that they capture for an event.

Also, although several embodiments described above and below facilitate the sharing of photos amongst devices that join an event at a particular locality, one of ordinary skill will realize the some embodiments use the same techniques to share other content for such an event. For instance, some embodiments allow the devices to share video content for an event that they join at the particular locality.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
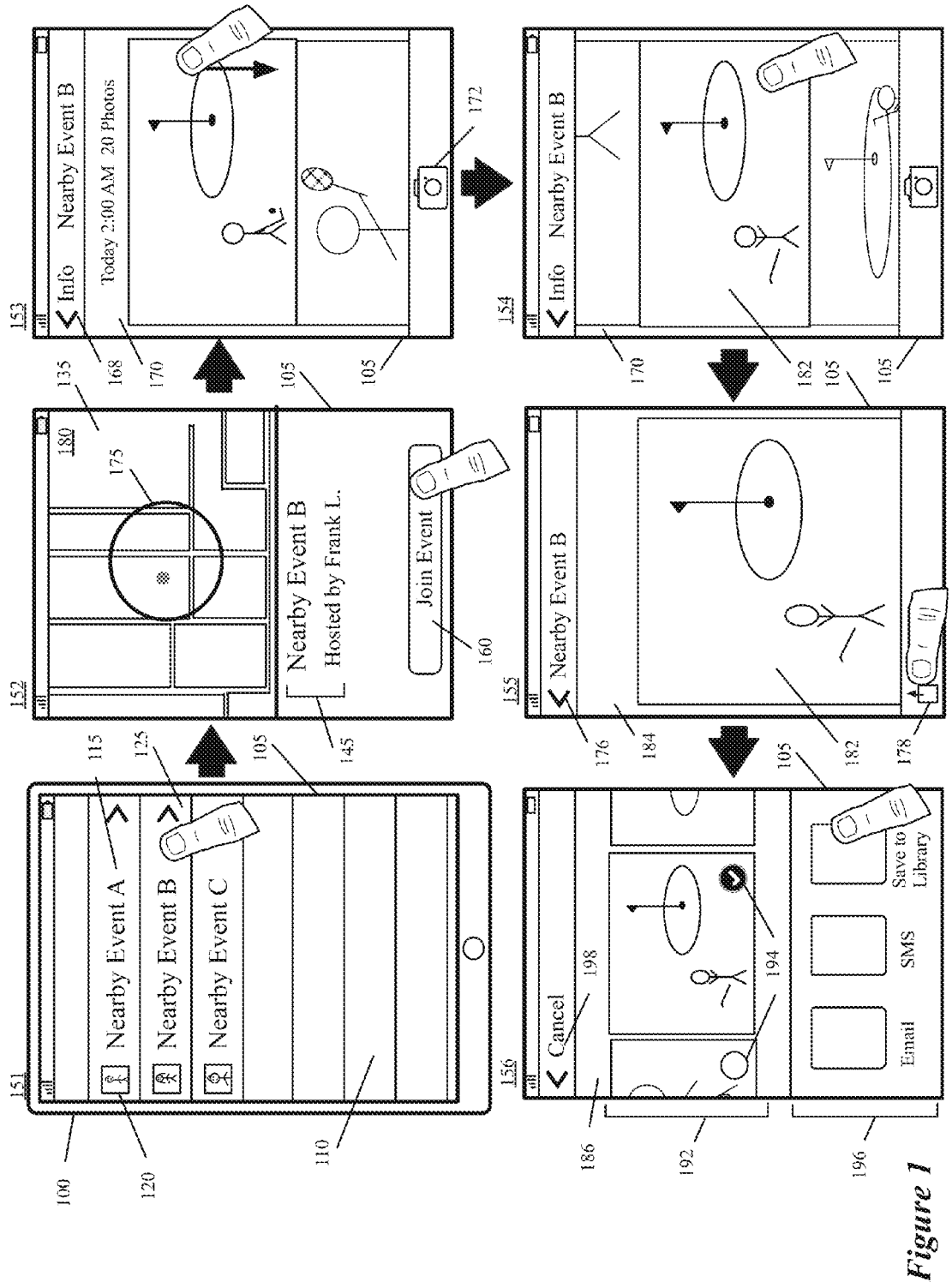
FIG. 1 illustrates an example of a mobile device viewing and joining nearby image-sharing events.

Some embodiments provide a mobile device that implements a region-based method for sharing photos between devices. FIG. 1 illustrates one such mobile device 100. The mobile device 100 is a smartphone or tablet with a touch-sensitive screen and a camera (not shown). This mobile device 100 allows a user to participate in image-sharing events that have been created for regions that are near the device. In some embodiments, the device can join an event while being within the event's associated region, while in other embodiments, the device can join the event while being near or within this region. Once the device has joined an event, the user of that device (1) can view photos captured by the other event participants, and (2) can capture photos for viewing by the other event participants.

FIG. 1 shows the operation of the mobile device 100 in six stages 151-156. Each of these stages shows a user interface (UI) 105 of an image-sharing application that executes on the mobile device 100. The application in some embodiments is part of the operating system of a device, while in other embodiments, it is an application that executes on top of the device operating system. As shown, the application UI 105 displays in the first stage 151, a list 110 of several image-sharing events that have been defined for several regions near the current location of the device 100.

Figure 2:
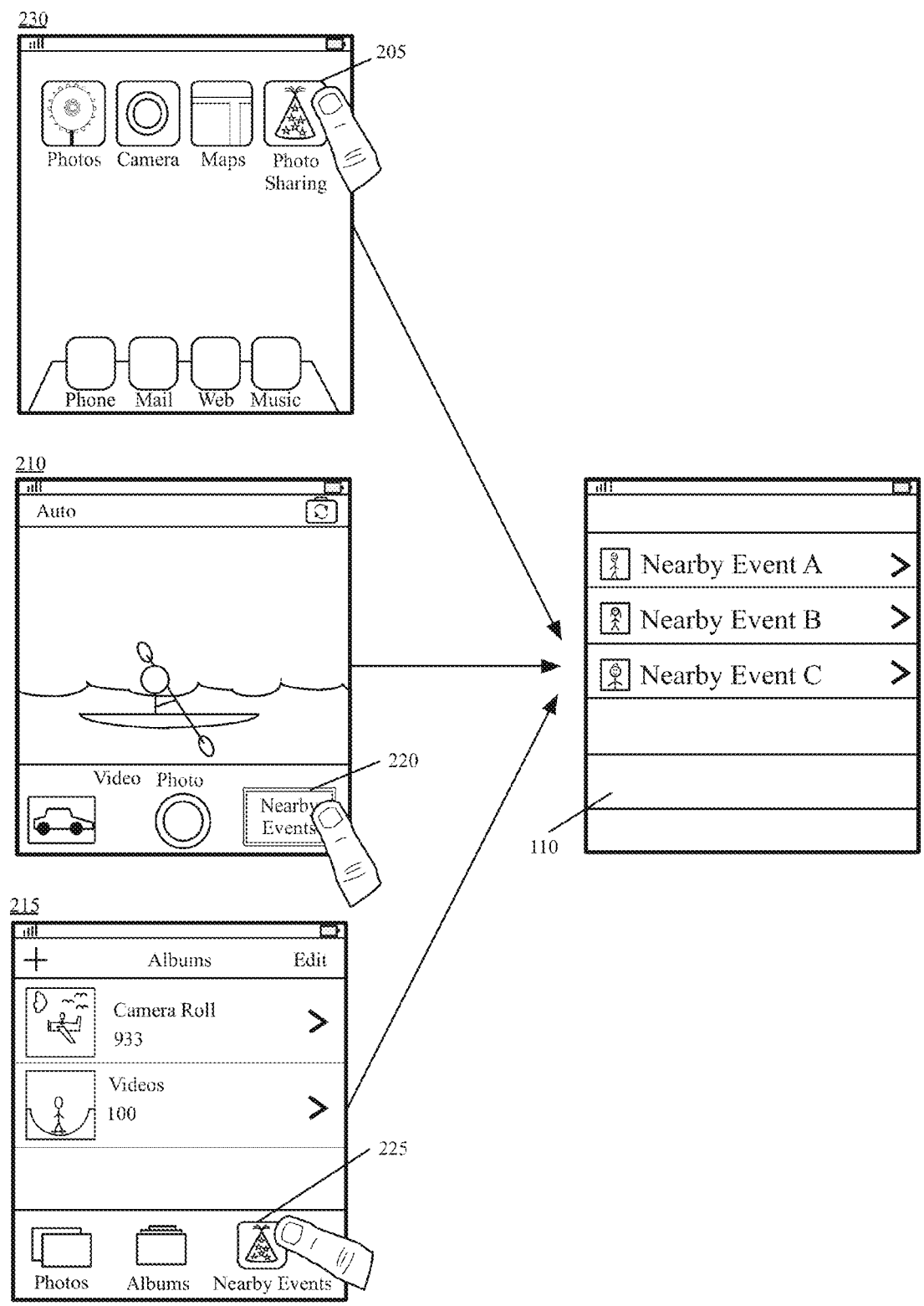
FIG. 2 illustrates different ways that nearby image-sharing events can be viewed in some embodiments.

This list 110 is reached differently in different embodiments. FIG. 2 illustrates this point by showing that the first stage 151 of FIG. 1 is reached in different embodiments through different applications. Specifically, it shows that the list of nearby events is reached (1) when an image-sharing application 205 is opened in some embodiments, (2) when an image-sharing mode 220 of a camera application 210 is selected in other embodiments, and (3) when an image-sharing mode 225 of a photo-organizing application 215 is selected in yet other embodiments. In other embodiments, this list is presented through other applications, through an operating system service of the device, or through other mechanisms (e.g., is refreshed and presented each time the list of nearby events is requested). In the embodiments in which the list 110 is reached through the selection of a modality of an application (e.g., of the camera application 210 or the photo-organizing application 215), the image-sharing application is the application in which the modality is selected or is an application that is called when the modality is selected in the other application.

Figure 3:
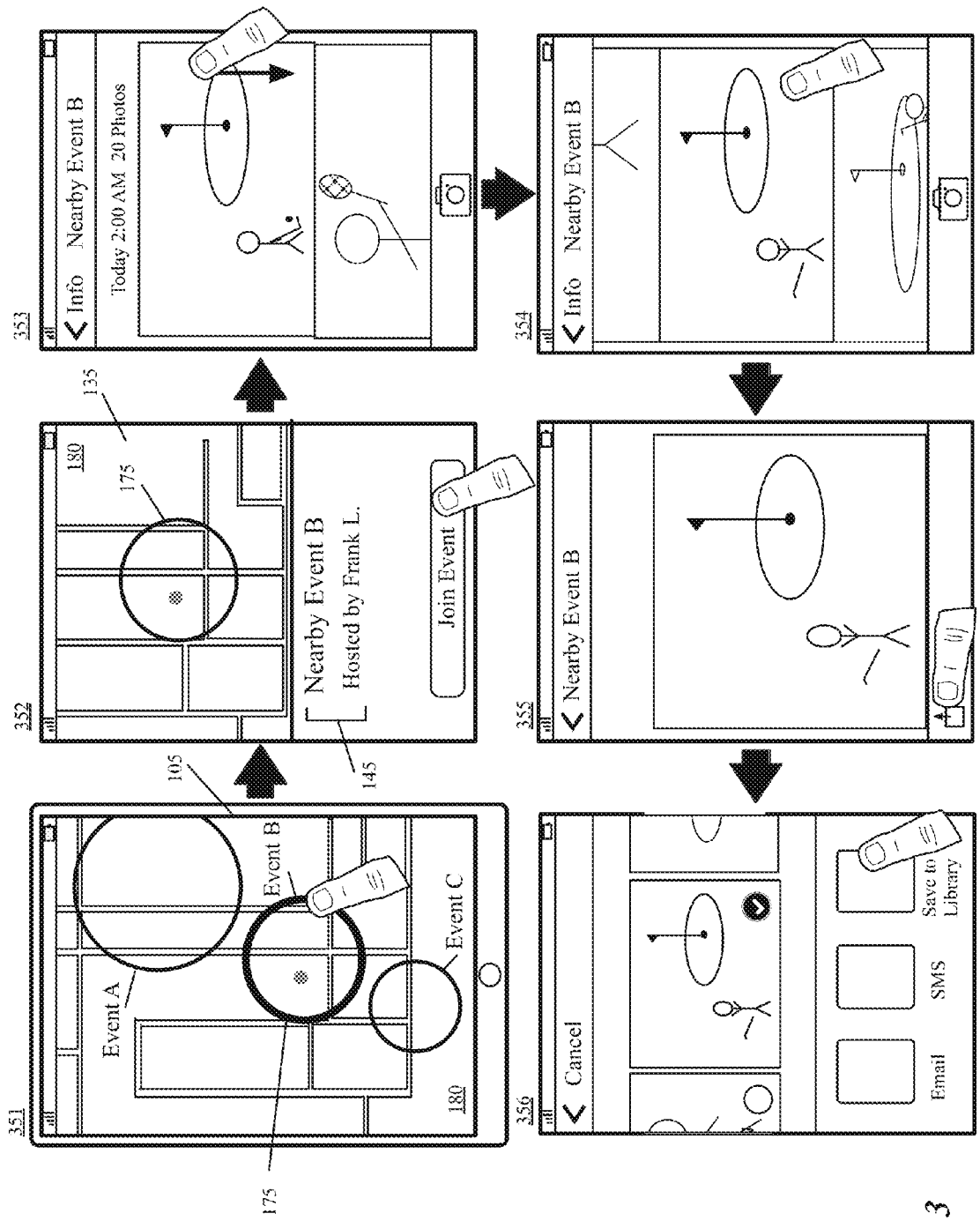
FIG. 3 illustrates an alternative display of nearby image-sharing events.

In the list 110 of events, each nearby event is represented by a name 115 of the event and a photo 120 for the event. In some embodiments, the photo 120 is the photo of the person who organized the event. In other embodiments, the photo 120 is any photo that the organizer of the event picked for the event. Instead of showing a list of nearby events, the image-sharing application of some embodiments displays the nearby events on a map that shows the current location of the device, as shown in FIG. 3. The example illustrated in FIG. 3 is identical to the example illustrated in FIG. 1, except for the different presentation of nearby events in the first stages 151 and 351.

The first stage 151 of FIG. 1 shows the user selecting the second event 125 in the list 110, while the first stage 351 of FIG. 3 shows the user selecting the representation 175 of the event 125 on the map 180. In both of these examples, as well as other examples described below, the user selects an item in the user interface by tapping the touch-sensitive screen of the mobile device at the location that displays the item.

As shown in the second stage 152, the selection of the second event 125 in either FIG. 1 or 3 causes the image-sharing application to display a page 135 that displays additional information about the selected event. In some embodiments, the application displays the region 175 of the event on a map 180, plus some additional information 145 about the event, such as the name of the event and the name of the organizer of the event, as shown in the second stage 152. In other embodiments, the application displays other information about a selected event, such as the identity of the participants at the event or other event data.

With the presented data, the application in some embodiments provides a selectable UI item 160 (e.g., a button) for the user to employ to have his device join the selected event, as shown in the second stage 152. In some embodiments, the device 100 can join the event 125 while being within the event's associated region 175, while in other embodiments, the device can join the event while being near or within this region 175. This is enforced by the photos-sharing application in some embodiments by not allowing the UI item 160 to be invoked (e.g., by graying out this item and not taking any actions when it is selected), when the user's device does not meet the location-criteria for joining the event. In other embodiments, the application allows the UI item 160 to be invoked, but then allows or denies this request by comparing the location of the user's device with the event's region to determine whether the user's device meets the location-criteria for joining the event.

Once the device 100 is allowed to join the event 125, it can receive images that are captured by other devices participating in this event 125, and it can capture images for the event and share these images with the other devices. In some embodiments, all of these other devices would have to join the event by meeting the location-criteria for joining the event. Stages 153 and 154 illustrate how the image-sharing application of some embodiments allows a participating device to view the photos captured for the event by the participating devices. As shown, the application displays the captured photos on a scrollable event-image page 170 that allows the user to browse the captured photos.

Also, as further shown in stages 153 and 154, the application provides two controls 168 and 172 with the event-image page 170. The control 168 is to return to the info-display page 135 of the second stage 152. The second control 172 is an affordance 172 for capturing photos inline with the display of the photos captured for the event. Specifically, in some embodiments, this affordance is a user interface (UI) item 172 (e.g., a button) (1) that is displayed on the event-image page 170 that displays the captured photos of the event, and (2) that is used for starting a camera modality (e.g., opening a camera application) for taking a photo for the event. While the UI item 172 appears as part of the UI's chrome that is placed over the scrollable page 170, this control appears differently in other embodiments. For instance, this item appears as a floating control in some embodiments, while appearing at the bottom of a scrollable page 170 in other embodiments. In this document, the terms UI item and control are used interchangeably. They refer to affordances of the UI, which may have a persistent or a periodic displayed representation in the UI in some instance, while not having a displayed representation in the UI in other instance.

Once the user selects the camera UI item 172 and places the image-sharing application in its camera modality, the user can just take one photo for the event in some embodiments, while the user can take one or more photos for the event in other embodiments. In some embodiments, the image-sharing application provides an affordance that allows the user to specify whether a captured photo should be added to the set of photos captured for the event by the devices participating in the event. For instance, after each photo is captured, some embodiments provide one control for discarding the captured photos and adding captured photos to the set of photos for the event. Other embodiments allow the user to capture multiple photos sequentially, and then either (1) to individually discard or add the captured photos to the event, or (2) concurrently select multiple captured photos for discarding or for adding to the event.

To add captured photos to the set of photos shared for an event, the participating device in some embodiments has to capture photos within the region associated with the event. Other embodiments allow photos to be captured and distributed for an event at a location that is near the event's region but not necessarily within this region. Still other embodiments allow a participating device to capture and distribute photos for an event irrespective of the location of the device at the time the photo is captured; all these embodiments require is that the device join the event while being within the region associated with the event.

The fourth stage 154 shows the user selecting a photo 182 that is displayed on the event-image page 170 as one of the photos captured for the event. As shown in the fifth stage 155, this selection directs the image-sharing application to present an image-focus page 184 that provides a larger view of the selected photo 182. On this page, the application provides two controls 176 and 178. The control 176 is to return to the event-image page 170 (of the third and fourth stage 153 and 154) to see all of the captured photos for the event.

The control 178, on the other hand, is for saving or distributing one or more of the captured photos. In some embodiments, the selection of control 178 just directs the image-sharing application to save the selected photo 182 to a local photo data store of the device 100. However, as shown by the fifth and six stages 155 and 156, the selection of this control 178 in some embodiments directs the application to open a page 186 on which multiple photos can be selected and multiple actions can be performed on the selected photos. When this page is initially opened, the photo 182 is automatically selected, as shown. The other photos can be selected by scrolling, if necessary, through a scrollable photo window 192, finding the desired photo, and selecting the desired photo (e.g., by tapping on the photo or on the check area 194).

Below the scrollable window is a scrollable control window 196 that includes multiple controls for saving and/or distributing the photos selected in the scrollable photo window 192. In some embodiments, these controls include (1) one or more controls for saving the selected photos to one or more local data stores (e.g., databases) of the device 100 or one or more remote data stores that are communicatively connected to the device 100, and/or (2) one or more controls for distributing the selected photos through one or more distribution mechanisms (e.g., email, text, social media post, etc.). The page 186 also has a cancel control 198 for returning to page 184 of the fifth stage 155.

In some embodiments, the user of the device 100 needs to download photos captured for an event because, even though the user's image-sharing application obtains all the captured photos of the event, this application only temporarily stores the received, captured photos in its local database. From this database, the application in some embodiments purges photos (e.g., in some embodiments, purges photos for inactive events after a particular time period, once the event has ended). Accordingly, if a participant likes a captured photo, the participant in these embodiments needs to save the captured photo (e.g., to a local photo library on his device).

In addition to the controls illustrated in FIG. 1, the image-sharing application of some embodiments provides other controls for viewing and sharing the photos captured for an event. For instance, in some embodiments, the image-sharing application provides a set of controls for allowing one participant to filter the displayed photos to only include photos captured by a set of one or more participants. For instance, in some embodiments, the application allows one particular participant to be selected from a list of participants, in order to view the photos captured by the particular participant.

Although several embodiments described above and below facilitate the sharing of photos amongst devices that join an event at a particular locality, one of ordinary skill will realize that some embodiments use the same techniques to share other content for such an event. For instance, some embodiments allow the devices to share video content for an event that they join at the particular locality.

Different embodiments employ different mechanisms to facilitate the distribution of photos between the devices that are participating in an image-sharing event that is defined for a locality. Some embodiments enable this distribution through a peer-to-peer model in which the devices communicate directly with each other to distribute captured photos. For instance, in some embodiments, the devices at one region identify each other so that each time one of them captures a photo for the event, it pushes this photo to the other devices through direct wireless communication links with the other devices.

Figure 4:
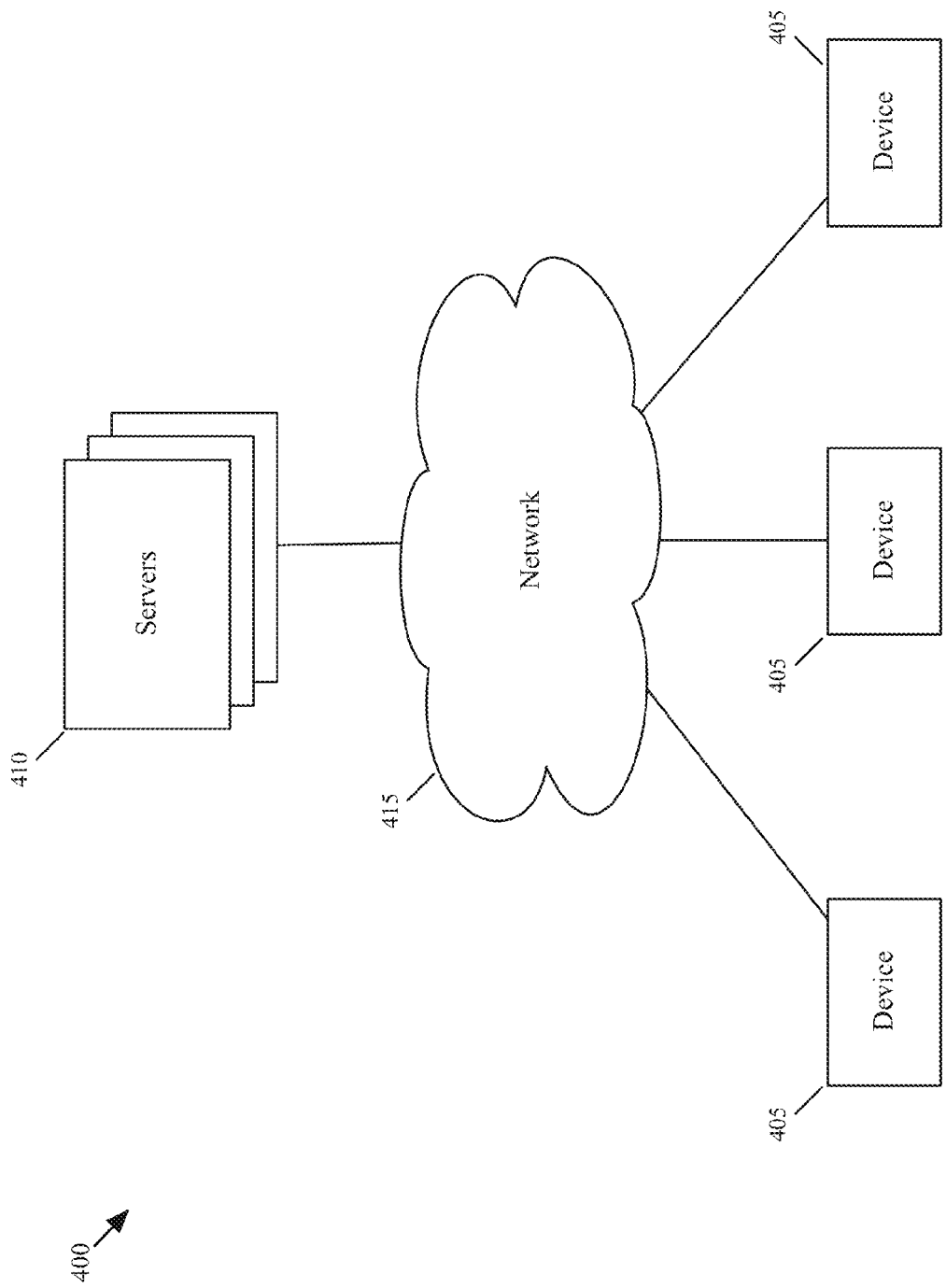
FIG. 4 illustrates a client-server model for creating region-based image sharing events and distributing images between participants of these events.

Other embodiments, however, use a client-server model to facilitate the distribution of photos between the devices participating in an event. FIG. 4 presents a system diagram 400 that illustrates this client-server model. As shown in this figure, the client-server system includes several participating devices 405 that communicate with a set of servers 410 in order to organize events, join events and distribute photos for an event. The participating devices 405 and the server set 410 communicate through a network 415, which can be any time of network, such as a local area network, a wide area network, or a network of networks (such as the Internet). In some embodiments, the network includes a cellular data network that connects to the devices wirelessly and connects to the server set through the Internet.

One advantage of a client-server model is that it frees the devices from the task of communicating directly with each other to organize events, join events or distribute the captured photos. This allows two devices to share images that they capture even though they are not at the event's region at the same time, or at any common, small region at the same time. The client-server model also allows a participating device to see photos for an event even after the device leaves the location of the event and is too far for simple peer-to-peer communication with other devices.

Several client-server models are described further below. In some of these models, the server set 410 allows each of several devices to organize one or more image-sharing events in which multiple devices can participate. In some of these embodiments, the server set 410 communicates with the image-sharing application that executes on each of these devices 405 to organize events and share photos amongst the devices. When the user requests the creation of an image-sharing event, the image-sharing application presents to a user a set of controls for defining a geographic region for the event. In some embodiments, the set of controls includes (1) a map that displays an area, and (2) a geometry tool that allows the user to draw, move and adjust a shape (e.g., a polygon, a circle, etc.) on the map to specify a region for the event.

Once the event organizer uses these tools to define the region for the event, the user's image-sharing application sends the region definition to the server set. In some embodiments, the region is defined in terms of one or more geographic attributes. For instance, the geometric attributes in some embodiments include a latitude, a longitude, and a set of shape attributes that define a shape about the latitude and longitude (e.g., a radius of a circle that has its center at an intersection of the latitude and the longitude).

In response to the supplied region information, the server set creates the event for the specified region, and adds it to a data store of events that the server set maintains. In some embodiments, the server set indexes its data store of events based on location data (e.g., based on latitude and longitude data, a hash of this data, etc.). In some embodiments, the server set or the organizer's image-sharing application requires the event organizer's device to be within the event's region while defining the event. In other embodiments, the event organizer's device can define an event for a region from outside of the event's region so long as the organizer's device is within a threshold distance of the region while defining the event. Other embodiments place no geographic restrictions on the organizer's device. However, some of these embodiments require the organizer to show up to the event's region before allowing others to join the event.

Once an image-sharing event is created, other users can join the event. In some embodiments, a user joins an event as a participant by selecting the event from a list of nearby events that is presented by the image-sharing event application of the user's device. To obtain this list, the image-sharing event application provides the server set with the location (e.g., the latitude and longitude) of the user's device. Based on the supplied location data, the server set searches its events data store and identifies one or more events that are near the supplied location of the user's device.

In some embodiments, the image-sharing application displays the nearby events that it receives from the server set in a list of events that also includes events that the application organized before, as well as events that the application joined previously. In this list, the application in some embodiments only presents a previously joined event while the event is active. In other embodiments, the application also displays, in this list, inactive previously joined events that ended within a specified time period before the time that the list is being presented.

In some embodiments, the user can select any of the events on the event list presented by the image-sharing application of his device. When the user selects a new event to join, the image-sharing application and/or the server set perform the operations described above by reference to FIG. 1 to allow or prevent the user from joining event. As mentioned above, these operations ensure that the device meets the location criteria of the event (e.g., being within the region associated with the event) before it is allowed to join the event.

When the user joins a new event, or selects a previously joined or organized event from the presented event list, the user in some embodiments is presented with (1) photos that were captured for the event by devices participating in the event, and (2) controls that allow the user to capture photos for the event. In some embodiments, the user is presented with the captured photos and with the controls for capturing photos in a manner similar to the approach described above by reference to FIG. 1.

To facilitate the sharing of the photos, the image-sharing applications and/or server set of some embodiments make the photos that are captured for the event available for viewing for a period of time after the event has ended. This extra time provides the event participants more time to view and save photos captured for the event.

An image-sharing event is terminated differently in different embodiments. For instance, in some embodiments, the event organizer can terminate an event explicitly or implicitly (e.g., by leaving the region of the event). Conjunctively, or alternatively, the server set or an organizer's image-sharing application in some embodiments terminates an event after particular duration of time. In some of these embodiments, the event organizer specifies the duration of the event at the time of organizing of the event.

Figure 5:
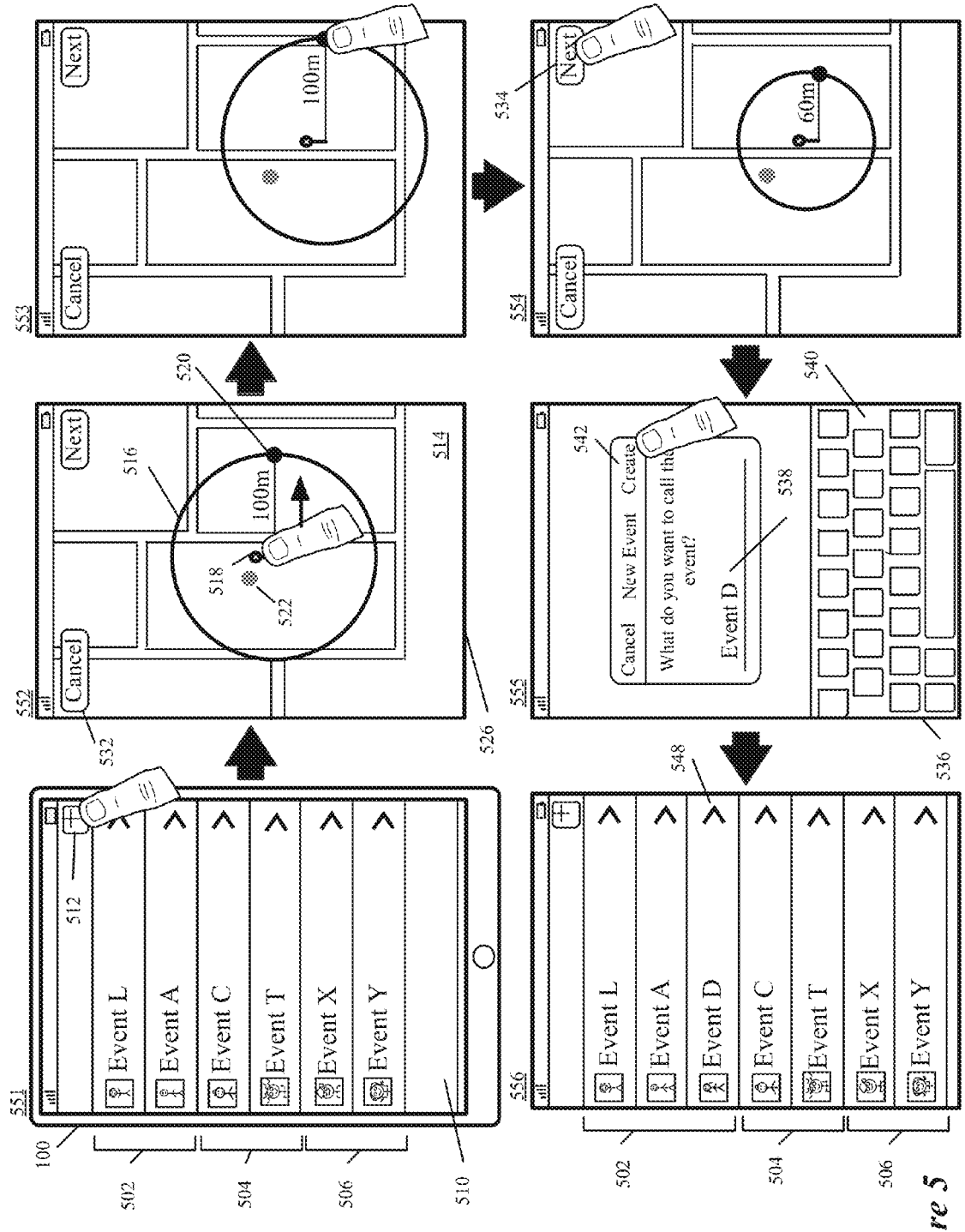
FIG. 5 illustrates an example of organizing an event in an image-sharing application.

FIG. 5 illustrates how the image-sharing application of the device 100 allows the user of the device to organize a region-based, image-sharing event. To organize this event, the application in some embodiments interacts with the server set to organize the event, as further described below. However, as mentioned above, image-sharing applications do not use a client-server model in some embodiments to organize events and to share photos for such events.

The example presented in FIG. 5 is illustrated in terms of six operational stages 551-556 of the UI 105 of the image-sharing application of some embodiments. As shown, the application UI 105 displays in the first stage 551 a list 510 of several image-sharing events that includes (1) active events 502 that the device 100 previously joined, (2) nearby active events 504 that are near the current location of the device 100 and that the device 100 has not yet joined, and (3) inactive events 506 that the device 100 previously joined and that terminated within a particular time period of when the list is being presented. To differentiate the nearby events 504 from the previously joined or organized events 502 and 506, the discussion below refers to the nearby events 504 as nearby candidate events, in order to indicate that these nearby events are candidate events for the device to join.

In some embodiments, the image-sharing application differentiates the display appearance of active events 502, nearby candidate events 504, and inactive events 506 on the event list in order to assist the user to quickly differentiate between the different types of events. Other embodiments might place these different event types under different heading.

The list 510 of events is reached differently in different embodiments. For instance, as described above by reference to FIG. 2, this list is reached when the image-sharing application opens in some embodiments, or is reached when an image-sharing modality of another application is selected in other embodiments. When the list 510 is reached through the selection of a modality of an application, the image-sharing application is the application in which the modality is selected or is an application that is called when the modality is selected in the other application. Also, in some embodiments, this list is refreshed each time the user specifically requests to view it.

Irrespective of how this list is reached, the image-sharing application of the device 100 obtains this list from the server set after the application provides the current location of the device 100 This application provides its current location to the server set in a request to see image-sharing events that are near the device's location. With this list, the device's image-sharing application gets metadata regarding each event on the list from the server set. In some embodiments, the provided metadata for each event includes the event's name, a photo associated with the event (e.g., a photo of the organizer of the event), geographic location of the event, and some additional information about the event (such as the name of the organizer and/or non-organizing participants of the event). The application uses this metadata to generate its list 510 of image-sharing events in the first stage 551.

In some embodiments, the event list 510 is presented with an event-organizing affordance for adding new events. In the example illustrated in FIG. 5, this affordance is an add event button 512 that is selected by the user in the first stage 551. As shown in the second stage 552, this selection directs the image-sharing application to present a region-defining page 526 with a set of controls for defining a geographic region for the event. The set of controls includes (1) a map 514 that displays the area of the current location of the device 100, and (2) a geometry tool 516 that allows the user to draw, move and adjust a shape on the map to specify a region for the event. The user can scroll the map 514 on the presented page 526 (e.g., by performing swipe touch gestures) to see additional areas on the map.

The geometry tool 516 is different in different embodiments. In the example illustrated in FIG. 5, the geometry tool 516 is a circle with two selectable controls 518 and 520. The circle 516 is the shape that defines the region for the event being organized. Its first control 518 is a center selector, which, as shown in the second and third stages 552 and 553, allows the circle 516 to be selected and moved to new locations in the displayed map 514. In some embodiments, the image-sharing application initially presents the circle's center at or near the current location 522 of the device 100. Also, this application in some embodiments does not allow the circle 516 to be moved to a location that does not contain the current location 522 of the device 100. In other embodiments, the application allows the user's current location 522 of the device to be outside of the circle 516 so long as this device is within a threshold distance of the circle. In still other embodiments, the device's current location 522 does not serve as a barrier to moving the circle. In fact, some embodiments place no geographic restrictions on the organizer's device. However, some of these embodiments require the organizer to show up to the event's region before allowing others to join the event.

The circle's second control is a radius adjusting control 520. As shown in the third and fourth stages 553 and 554, the user can adjust the size of the region-defining circle 516 by selecting the control 520 and dragging it to a new location, in order to increase or decrease the radius of the circle (e.g., from 100 meters to 60 meters). While circular regions are shown in FIG. 5 and some of the other figures, one of ordinary skill will realize that the image-sharing application in other embodiments provides geometry tools for defining other types of regions (such as rectangles or other polygons).

As shown in FIG. 5, the region-defining page 526 includes a cancel control 532 for canceling the event organizing operation, and a next control 534 for continuing the event organizing operation. As shown in the fourth and fifth stages 554 and 555, the selection of the next control 534 presents a page 536 through which the user can specify additional attributes of the organized event. In this example, the attribute specified on this page is the name of the event, which the user provides in field 538 through the on-screen keyboard 540 and through the create control 542. Other embodiments provide other controls on this or other pages for allowing the user to provide other attributes for the organized event. For instance, some embodiments provide a camera control for allowing the user to take a picture to associate with the event. In the example illustrated in FIG. 5, the application does not have such a camera control because this application in some embodiments associates the photo of the user of the device 100 with the organized event. In other words, these embodiments display the organizer's photo with the name of the event in the list of events that they present to participants and would be participants of the event.

As shown in the fifth and sixth stages 555 and 556, the selection of the create control 542 directs the image-sharing application to create the event for the region displayed in the fourth stage 554. The creation of this event is pictorially depicted in the sixth stage 556 by showing its addition to the event list 510. Specifically, the newly organized event 548 is added to the list of active events 502 that the device 100 previously joined.

To create the event, the image-sharing application of the device 100 in some embodiments has to be able to connect to the server set so that it can send the definition of this region to the server set. In some embodiments, this region is defined in terms of the latitude and longitude of the circle's center, plus a radius of the circle. If the application can connect to the server set, the server set creates the event for the specified region, and adds it to a data store of events that the server set maintains. In some embodiments, the server set indexes its data store of events based on location data (e.g., based on latitude and longitude data, a hash of this data, etc.).

Figure 6:
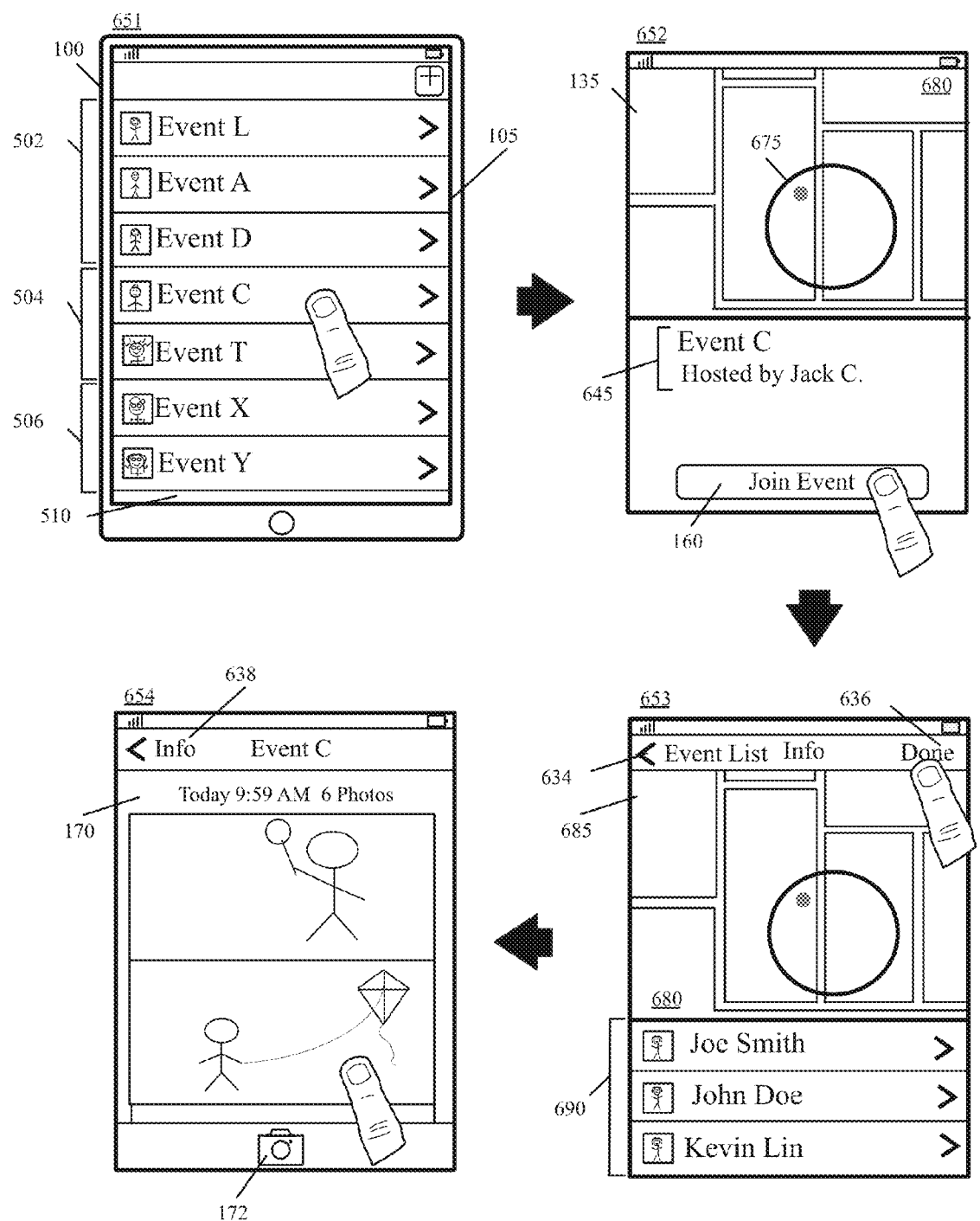
FIG. 6 illustrates an example of a user device joining an active event.

FIG. 6 illustrates how the image-sharing application of the device 100 allows the user of the device to join a nearby candidate event. The example in this figure will be described by reference to FIGS. 7, 8 and 9, which illustrate different criteria that the image-sharing application of applies in different embodiments to allow the device 100 to view and join nearby candidate events. The example presented in FIG. 6 is illustrated in terms of four operational stages 651-654 of the UI 105 of the image-sharing application of some embodiments.

The first stage 651 shows the application UI 105 displaying the event list 510 that includes (1) active events 502 that the device 100 previously joined, (2) nearby candidate events 504 that are near the current location of the device 100 and that the device 100 has not yet joined, and (3) inactive events 506 that the device 100 previously joined and that terminated within a particular time period of when the list is being presented.

As mentioned above, the image-sharing application of some embodiments obtains this list from the server set by providing the current location of the device 100. The server set uses the location of the device plus the identification value associated with the device or the image-sharing application to identify nearby candidate events and previously joined or organized events. In some embodiments, the server set identifies these events by using the location and identity data to search (1) at least one data store that stores the organized events, and (2) at least another data store that stores the identities of the active events and unexpired inactive events that the device 100 previously joined or organized.

Like the event list 510 of FIG. 5, the event list 510 of FIG. 6 is reached differently in different embodiments, and will not be described further here, as the discussion above for the event list 510 is equally applicable to the event list 510. Also, as with the event list 510, the server set sends metadata regarding each event on the event list 510 and this metadata is used to display information about each event. Again, this metadata will not be further described here, as the discussion above for the event list 510 is equally applicable to the event list 510.

The first stage 651 shows the user selecting one of the listed nearby candidate events 504 (Event C) that the device has not previously joined. As shown in the second stage 652, the selection of the Event C causes the image-sharing application to display the event-preview page 135. As mentioned above by reference to FIG. 1, the event-preview page 135 displays, for the selected event, the region 675 of the event on the map 680, plus the name of the event and the name of the organizer of the event 645, as shown in the second stage 652.

Figure 7:
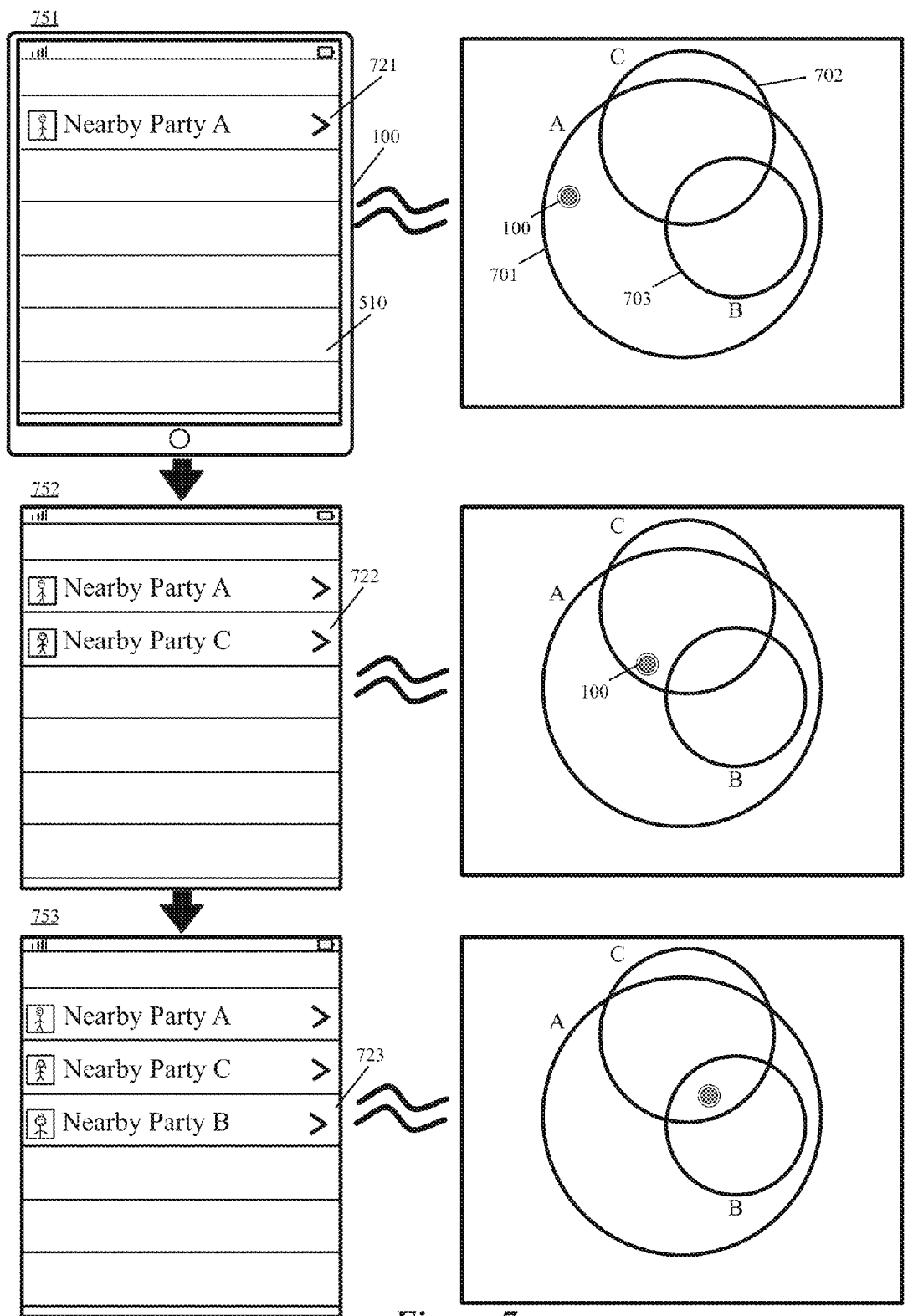
FIG. 7-9 illustrate different location criteria that are used in different embodiments to present nearby image-sharing events and to join these events.
Figure 8:
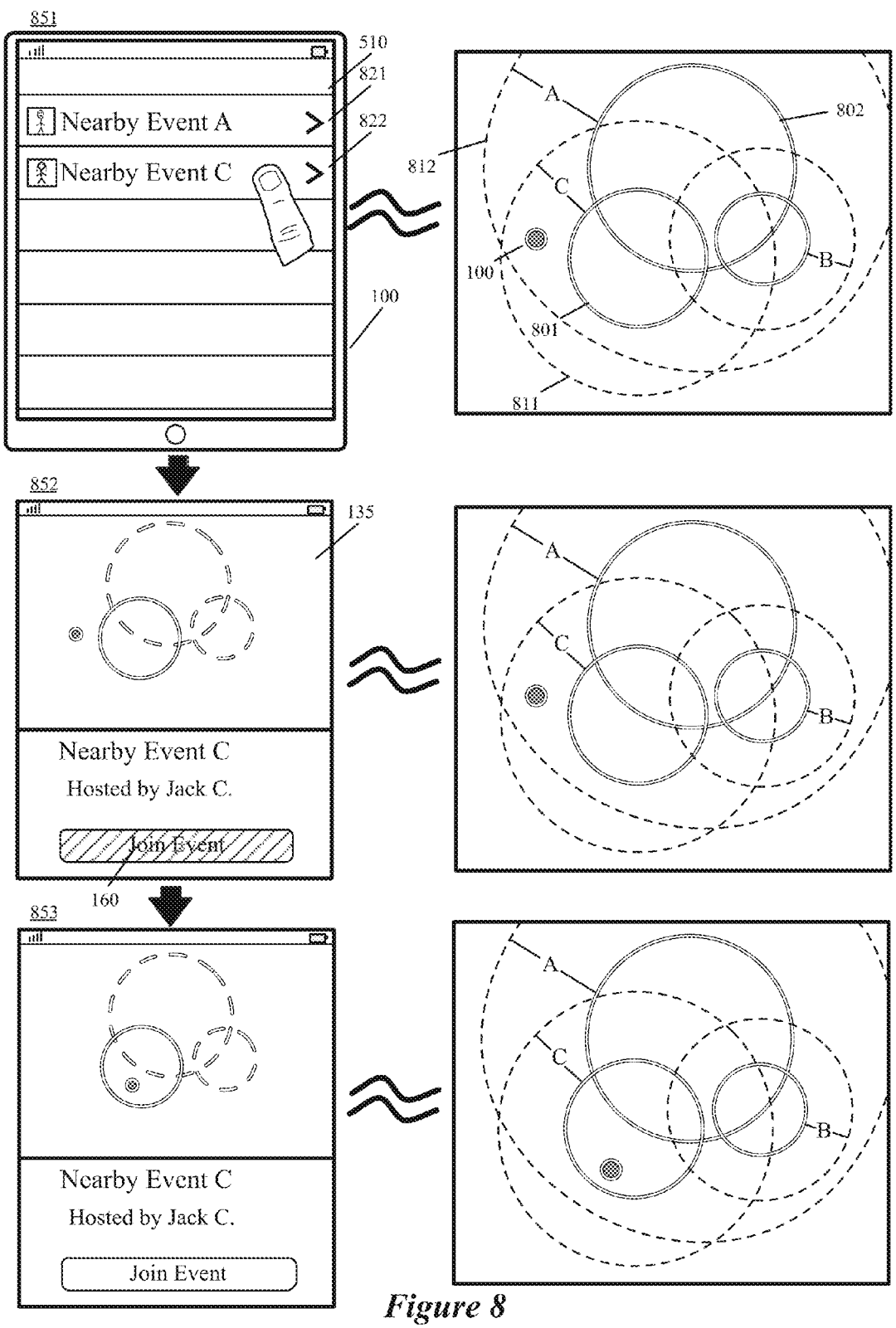
Figure 9:
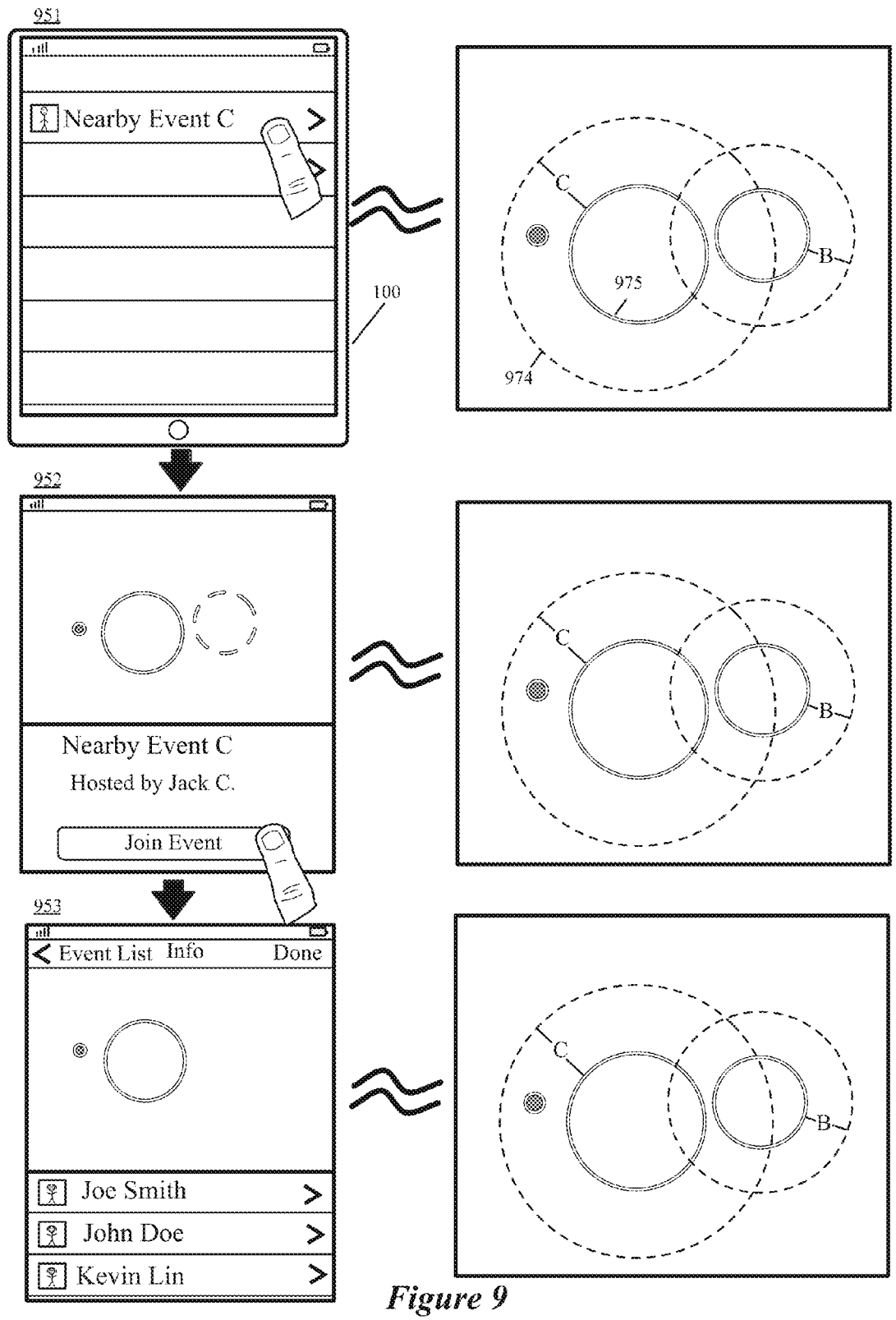

Also, as described above, the event-preview page 135 provides the selectable control 160 that the user can select to join the selected event, as shown in the second stage 152. As shown in FIGS. 7, 8, and 9, the device 100 in some embodiments can join the event while being within the event's associated region, while in other embodiments, the device can join the event while being near or within this region. These figures also illustrate different criteria that different embodiments employ to display nearby candidate events. The examples illustrated in these figures are each presented in three stages, with each stage showing the device UI display as well as a map of the device's location as compared to the regions defined by the organizers of the event.

In three stages 751-753, FIG. 7 illustrates an example that shows the image-sharing application of some embodiments only presenting nearby unaffiliated events when the regions of these events contains the current location of the device 100. This figure illustrates, for each of the three stages 751-753, a list of nearby candidate events as well as a map that displays (1) the current location of the device 100 and (2) different regions of the nearby candidate events. Given that the device 100 does not list a nearby candidate event when the device does not fall within the event's region, the device 100 can only join new events when the device is within the region that the organizer defined for the event.

The first stage 751 shows that a nearby candidate event 721 is displayed in the event list 510 because the device is within the region 701. The second stage 752 shows that the device 100 has moved and is now within regions 701 and 702. With the device now within both regions, the nearby candidate event 722, which corresponds to the event region 702, is now displayed in the event list 510 along with event 721. The third stage 753 shows that the device 100 has moved again and is now inside all three regions 701-703. The event list 510 now shows all nearby candidate events 721-723, which each correspond to their specified regions 701-703, respectively.

In three stages 851-853, FIG. 8 illustrates an example that shows the image-sharing application of other embodiments presenting nearby unaffiliated events when the device 100 is near the regions of these events. As shown, some embodiments define a larger region about each region that an event organizer specified for the event. So long as the device 100 falls within the larger region associated with the event 874, the device is within an acceptable threshold distance of the region specified for the event, and the application will display the event to the device's user.

The first stage 851 shows nearby candidate events 821 and 822 displayed in the event list 510, which correspond to regions 802 and 801. Here, unlike FIG. 7 in which the device 100 had to be within the user specified region, the device falls within larger regions, 811 and 812, associated with events 801 and 802, respectively. In this stage, the user selects a nearby candidate that is displayed within the event list 510.

Even though the application allows the device 100 to present nearby candidate events when the device does not fall within its specified region, this application in the example illustrated in FIG. 8 does not allow the device 100 to join this event until the device enters the specified region for this event. As shown in the second stage 852, after the user has selected the nearby candidate event 822, the event list 510 transitions to the info-display page 135 of the selected event. Here, although the user is able to view information regarding the event, because the device 100 falls outside the specified region 801, he is unable to join the event. This inability to join is reflected by the join control 160 (1) being initially grayed out in the second stage 852 for the Event C to indicate that this option is not selectable as the device is outside of this event's region 801. The third stage 853 shows that the device has moved into the specified region 801 of the nearby candidate event. After which, the join control 160 has become selectable for this event.

In three stages 951-953, FIG. 9 illustrates an example that shows the image-sharing application of still other embodiments allowing a device 100 to view and join new events even when the device is outside of the regions specified for these events by their organizers. As shown, the application allows the device 100 to view and join a nearby candidate event (e.g., Event C) so long as the device is within a threshold distance of the specified region for the event. As with the example of FIG. 8, the example of FIG. 9 enforces the threshold distance criteria by defining a larger region for each event about the event's specified region (e.g., defining the larger region 974 for the Event C about this event's specified region 975.

In the examples illustrated in FIGS. 7, 8, and 9, the image-sharing application enforces the rules for displaying and joining new nearby, unaffiliated events. In other embodiments, these rules are partially or fully enforced by the server set. For instance, in some embodiments, the image-sharing application sends the request to join an event to the server, which then allows or denies the request by analyzing the device's location data. Some embodiments not only require a device to meet the location criteria for joining an event but impose other criteria for restricting access to the event. Some of these embodiments use the server set to enforce some of these additional criteria. For example, in some embodiments, the server set receives a request to join an event so that the server set can obtain the event organizer's confirmation that the requesting device or user can join the event.

The third stage 653 illustrates that, in the example of FIG. 6, the device 100 is allowed to join the selected event in response to the user's selection of the control 160. As shown, the image-sharing application in some embodiments presents an event-info page 685 to provide additional information regarding the event that the device has joined as a participant. The event-info page 685 provides this additional information in conjunction with the map 680 of the event's region.

As shown, the additional information on the event-info page 685 includes a list 690 of all the users that are participating in the event. In some embodiments the list 690 is a scrollable list that allows users to browse through the list of participants. In some embodiments, the displayed list 690 of participants includes the organizer of the event. Also, as shown, a photo (if available) of each participant appears next to the identity of the participant in the list 690. The selection of one of the participants in the list 690 directs the application to show the photos that were captured for the event by that participant's device. Accordingly, by selecting a participant in the list 690, the user of the device 100 can filter the display of the event's captured photos to photos captured by the selected participant, as further described below. In some embodiments, the image-sharing application identifies one or more of the participants in the event in terms of their device identifiers or some other identifiers.

The event-info page 685 has two controls 634 and 636. The control 634 allows the user to return to the event list 510. When this control is selected, the image-sharing application updates the event list and displays this updated list in some embodiments. The control 636 allows the user to view the event-image page 170 that displays the photos captured for the selected event. The third stage 653 shows the selection of this control, while the fourth stage 654 displays the event-image page 170 with the photos that are captured for the selected event.

In some embodiments, the user of the device 100 can scroll the event-image page 170 to view the captured photos and to select photos for saving and/or distribution, as described above by reference to stages 153-156 of FIG. 1. Also, as described above, the event-image page 170 has an image-capturing affordance 172 inline with the display of the capture photos in order to make it easier for the user to view captured photos and to capture photos for an event in one unified location. The capture of photos for an event will be further described below by reference to FIG. 13. The event-image page 170 also has a backtracking control 638, which when selected, directs the application to go from the event-image page 170 back to the event-info page 685.

Figure 10:
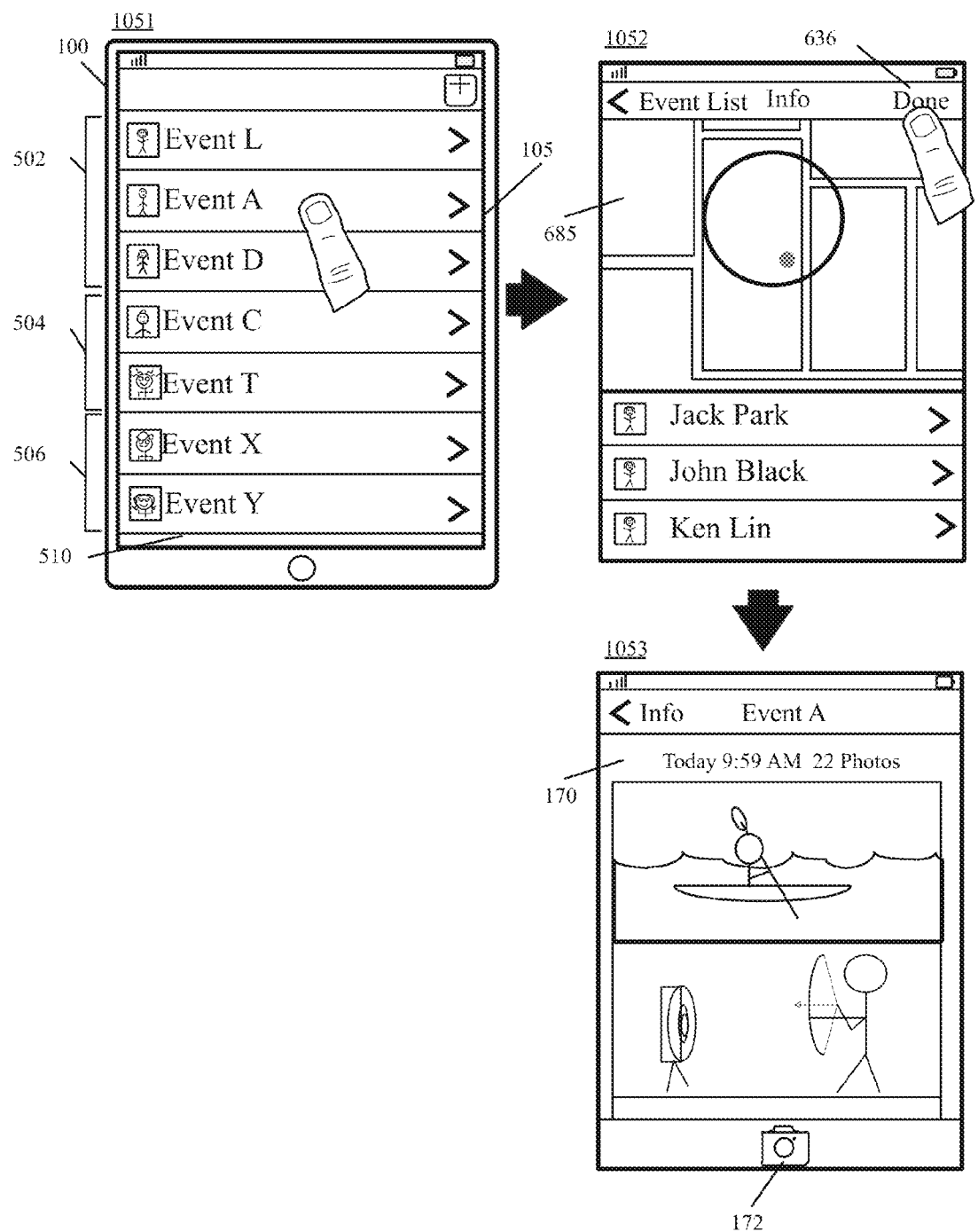
FIGS. 10 and 11 illustrate two examples of viewing images of previously joined events.
Figure 11:
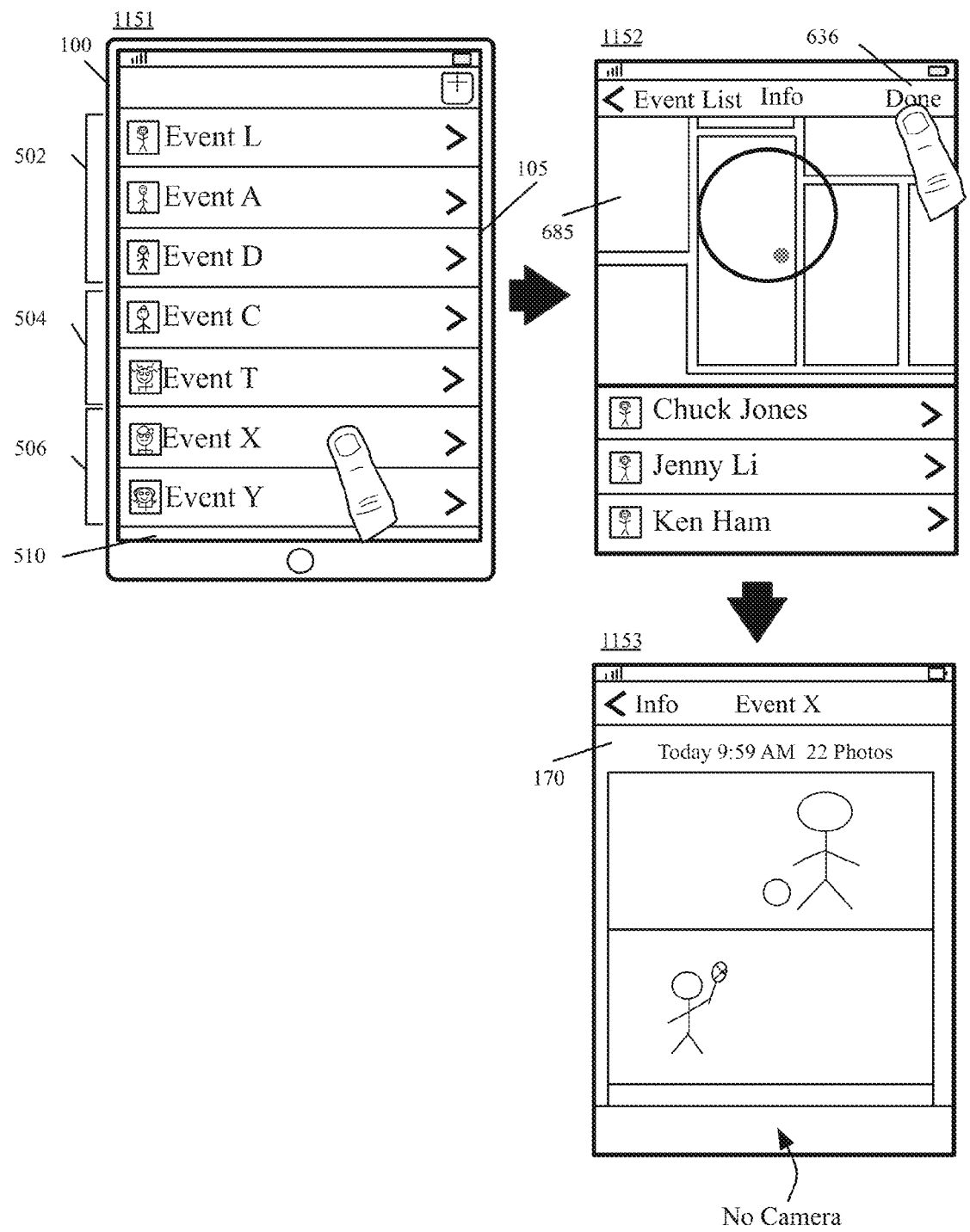

In the figures described above, several examples were provided for joining a new event. FIGS. 10 and 11 illustrate two examples of viewing photos of previously joined events. FIG. 10 illustrates an example of re-joining a previously joined active event, while FIG. 11 illustrates an example of viewing the photos of a previously joined inactive event that has not yet expired.

Each of these examples is illustrated in three operational stages 1051-1053 or 1151-1153 of the UI 105. The flow of UI operations in these stage is similar to the flow illustrated in FIG. 6, except that when viewing photos of a previously joined event, the UI 105 in some embodiments does not go through the event-preview page 135 that contains the join-event control 160 for requesting the addition of the device 100 to the event. Thus, from the event list page, the UI 105 transitions to the event-info page 685 when the user selects a previously joined, active event (Event A) on the event list 502 in FIG. 10, or when the user selects a previously joined, inactive event (Event X) on the event list 506 in FIG. 11.

These figures also show the UI 105 transitioning from the event-info page 685 (shown in the second stage 1052 or 1152) to the event-image page 170 (shown in the third stage 1053 or 1153) upon selection of the control 636. As shown, the event-info page in these two figures is similar except their photo content and the lack of the inline camera control 172 in the third stage 1153 of FIG. 11. This camera control is missing in FIG. 11, because unlike the still-active, selected event in FIG. 10, the selected event in FIG. 11 is no longer active. Hence, no camera is provided in the event-image page 170 of FIG. 11, as the user can no longer take photos for this event. The camera control is still available in the third stage 1053 of FIG. 10 because while the event is active, the user of the device 100 can take photos for the event.

As mentioned above, some embodiments make the photos that are captured for the inactive events available, because even after the event ends or otherwise becomes inactive, these embodiments provide extra time to the event participants to view and save photos captured for the event. This extra time is useful because in some embodiments the image-sharing application and/or the server set only temporarily stores the received, captured photos in their databases. A time period after the event ends, the image-sharing application and the server set in some embodiments, purge photos from their data stores. Accordingly, if a participant likes a photo captured for an event, the participant in these embodiments needs to save the captured photo (e.g., to a local photo library on his device) while the event is active, or is inactive but not yet expired.

Figure 12:
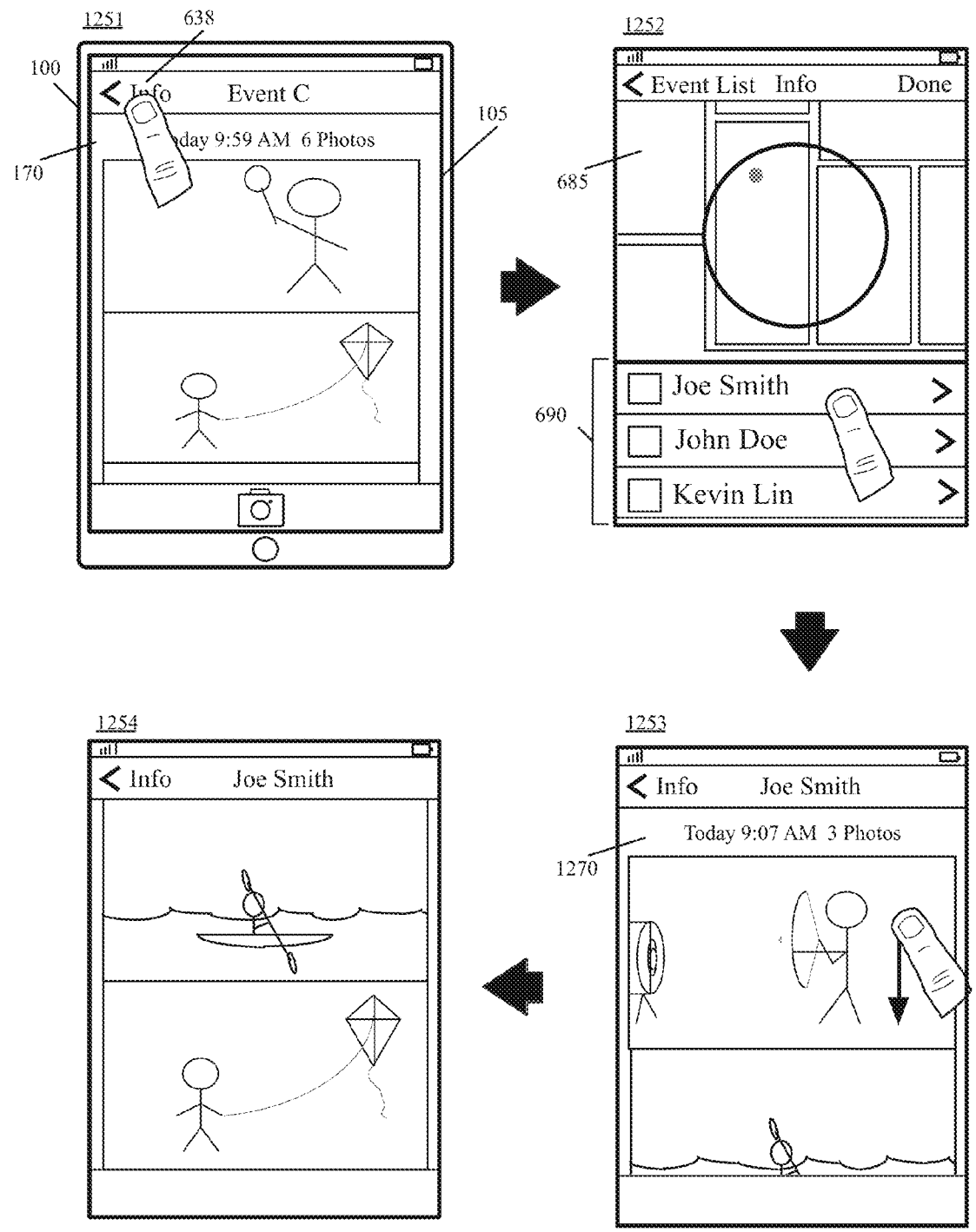
FIG. 12 illustrates an example of browsing through images captured by one participant in an event.

The image-sharing application of some embodiments provides a set of controls to allow the user of the device 100 to filter the displayed event photos to only include photos captured by a set of one or more participants. FIG. 12 illustrates how the UI 105 of the image-sharing application of some embodiments allows the photos to be filtered. Specifically, in four stages 1251-1254, it shows that the application in some embodiments allows the user of the device 100 to select one particular participant from the list of participants on the event-info page 685 in order to view the photos captured by the particular participant.

In this figure, the first and second stages 1251 and 1252 show that after the user selects the backtracking control 638 on the event-image page 170, the image-sharing application presents the event-info page 685. The second stage 1252 also shows the user selecting one participant (Joe Smith) in the list of participants 690 that is presented on the event-info page 685. As shown, this selection causes the application to present, in the third stage 1253, a participant-photo page 1270 that displays just the photos captured by the selected participant (Joe Smith). As further shown, the user can scroll this page 1270 to browse all the photos captured by the selected participant. The fourth stage 1254 shows that the user has scrolled through photos, in order to view additional photos taken by the selected participant.

In some embodiments, the image-sharing application allows the user to filter the event photos to include only photos from two or more participants. The UI 105 of this application provides different affordances in different embodiments to filter the photo display to include photos of multiple participants. For instance, in some embodiments, the UI 105 allows the user to select multiple participants on the participant list 690 on the event-info page, and then to direct the application (e.g., by tapping on any one of the selected participants) to present the photos captured by the selected participants. To select multiple participants in the list 690, the UI 105 in some embodiments allows the user to tap on multiple participant photos or multiple check boxes that are placed next to the participant names in the list 690. As the user taps on each participant's photo or check box, the UI changes (e.g., toggles) the appearance of the photo or the box to indicate the selection or de-selection of the corresponding participant. As used in this document, a check box is a shape that changes its appearance when it is selected and de-selected.

Figure 13:
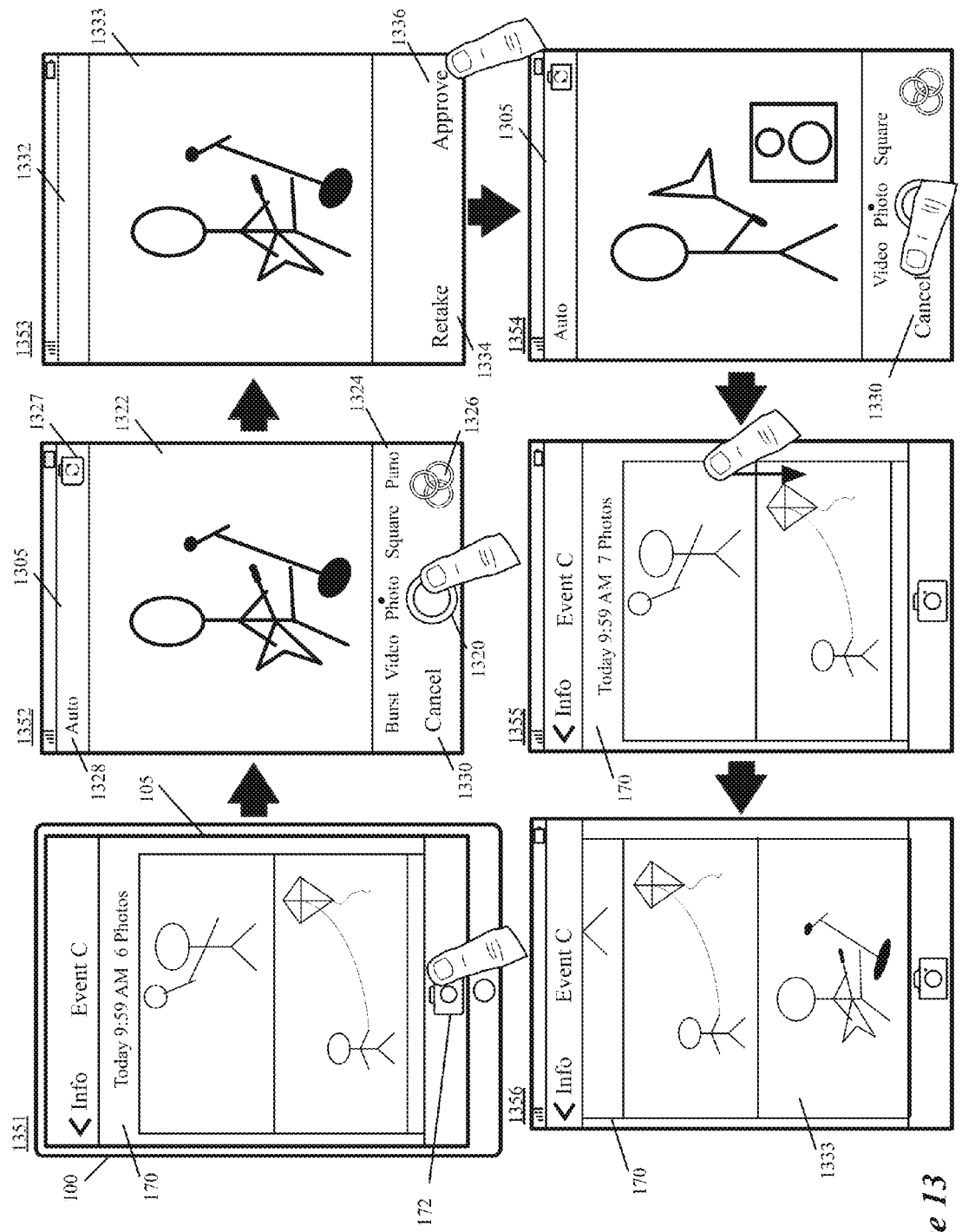
FIG. 13 illustrates an example of capturing an image within an image-sharing application of some embodiments.

FIG. 13 illustrates how the camera control 172 on the event-image page 170 allows a user of the device 100 to take a picture for an active event in some embodiments. The example presented in this figure is illustrated in six operational stages 1351-1356 of the UI 105. The first stage 1151 shows the user selecting the camera control 172 on the event-image page 170 of an event (Event C).

In response to this selection, the image-sharing application enters its camera modality, which displays a image-capture page 1305 and a set of camera controls, as shown by the second stage 1352. While the application is in the camera modality, the user can take and post multiple photos for the event. As shown in the second stage 1352, the set of camera controls includes many controls commonly found in today's smartphones, such as the iPhone® of Apple Inc. These controls include (1) an image capture control 1320 that directs the device to capture an image displayed in a camera display window 1322 of the image-capture page 1305, (2) a camera mode control 1324 that allows the user to switch between capturing photos, videos, panoramic photos, square photos, and burst mode photos, (3) a special effect control 1326 that allows the user to specify a special effect to be applied to the captured photos, (4) a flash control 1328 that allows the user to specify the flash behavior of the camera, (5) a cancel control 1330 for canceling the camera modality and returning to the event-image page 170, and (6) a switch camera control 1327 that changes the displayed image in camera display window 1322 captured between a set of cameras (e.g., a front and back camera) attached to the device 100.

As mentioned above, the image-sharing application of some embodiments not only allows the participants of an event to take and share photos for an event, but also allows these participants to take and share video, burst mode photos, panoramic photos and other image-driven content for the event. Some of these embodiments, however, apply different rules for distributing the different content. For instance, in some embodiments, the server set receives all captured content, but it distributes different captured content differently. In some embodiments, the server set distributes the photos captured for an event to all participants of the event, but distributes only photos or short snippets of videos captured for the event to the participants of the event, unless a device is connected to the server set through WiFi. This is because in these embodiments, the server set does not distribute video content automatically to participants that are connected to the server set through a cellular network, as such content clogs the bandwidth of the cellular network and consumes the participants monthly bandwidth allotment.

In other embodiments, the server set uses the same rules to distribute all types of content to the participants of an event. In yet other embodiments, the image-sharing applications and/or server set only distribute photo content and not video content. In some of these embodiments, the distributed photo content is only single image content and not multi-image content, such as those produced through burst mode settings. Other embodiments distribute all photo content and just forego video content. When some type of content is not distributed by the image-sharing application, the image-sharing application does not provide the control for capturing that type of content on its image-capture page during its camera modality.

The second stage 1352 shows the user selecting the image capture control 1320 to direct the device's camera to capture the image that is currently being displayed in the image display area 1322 of the image-capture page 1305. In response to this selection, the device's camera captures the image, and the image-sharing application displays this image 1333 in an image-preview page 1332 shown in the third stage 1353. As shown, this page 1332 has one control 1334 for discarding the captured photo 1333 and another control 1336 for accepting this photo.

The third stage 1353 shows the user selecting the accept control 1336 to accept the captured photo 1333. In response to this selection, the image-sharing application (1) adds this photo to the set of photos associated with the event (Event C in this example), and (2) sends this photo to the server set so that it can distribute this photo to other participants of the event. As shown in the fourth stage 1354, the application then returns to its image-capture page 1305 to capture another photo if needed.

Once the user approves a captured image for an event (e.g., through the selection of the accept control 1336), the image-sharing application automatically distributes this captured image to other devices that are participating in the event without any other user intervention. As mentioned above, this distribution in some embodiments entails forwarding the captured photo to the server set, which then forwards this captured photo to the other devices participating in the event.

The fourth stage 1354 also shows the user selecting the cancel control 1330 to cancel the camera modality. The fifth stage 1355 shows the application returning to the event-image page 170 once the camera modality is canceled. This stage 1355 also shows the user scrolling down on the page 170 to view the captured image 1333, which, in some embodiments, is presented at the end of the page 170, as shown in the sixth stage 1356.

Some embodiments implement the capturing of an image for an event differently. For instance, some embodiments allow the user to capture multiple photos sequentially, and then either (1) to individually discard or add the captured photos to the event, or (2) concurrently select multiple captured photos for discarding or for adding to the event. Also, some embodiments place geographic restrictions on where the device 100 can capture images for an event. For instance, to add a captured photo to the set of photos shared for an event, the device in some embodiments has to capture photos within the region or near the region associated with the event. Other embodiments allow a participating device to capture and distribute photos for an event irrespective of the location of the device at the time the photo is captured; all these embodiments require the device to join the event while being within the region associated with the event.

Figure 14:
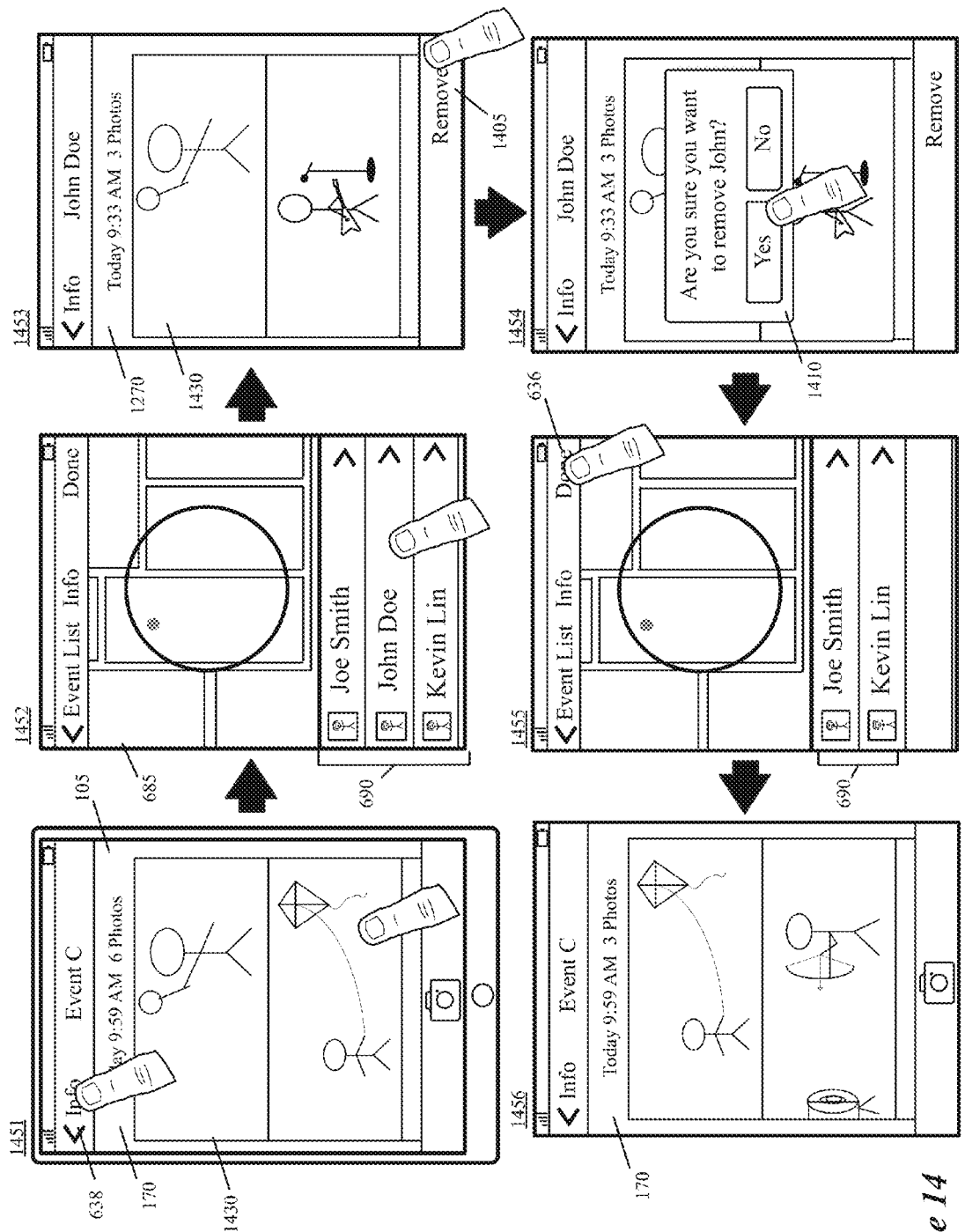
FIG. 14 illustrates an example of removing a participant from an image-sharing application.

In some embodiments, the image-sharing application provides one or more controls to the organizer of the event to control the event after creating the event. For instance, some embodiments provide an organizer with a set of controls for removing a participant from an event, while other embodiments do not provide such a functionality to the organizer FIG. 14 illustrates one set of controls that are provided by some embodiments to remove a participant from an event. The example presented in this figure is illustrated in six operational stage 1451-1456 of the UI 105 of the image-sharing application of some embodiments.

The first stage 1451 shows the user viewing the event-image page 170 of the Event C. The user in this example is the organizer of Event C. While viewing the event-image page 170, the organizer might see some images that he would like to remove from the set of shared images for the event. Some embodiments provide the organizer with controls (e.g., a discard button like the discard button 1336 of FIG. 13) to delete an image while viewing the image on the event-image page 170 that shows all the images for the event or on the image-focus page 184 (as shown in FIG. 1) that shows an enlarged view of one image. In some embodiment, the photo-sharing application provides such controls to the organizer of the event. These controls are not presented to the other participants in the event by their corresponding image-sharing applications, because some embodiments only allow the organizer to delete images from the event.

However, while viewing the event-image page 170, the organizer may decide that he wants to remove all the images captured by a participant. In some embodiments, to assist the organizer in identifying which images are captured by which participants, the application puts a legend (e.g., a name or other identifier) on each captured photo in the event-image page 170 to identify the participant that captured the photo.

The image-sharing application of FIG. 14 includes the controls to remove all the images captured by one participant on the participant-photo page. Hence, to remove photos of one participant, the organizer needs to select the back-tracking control 638 in the first stage 1451, in order to direct the image-sharing application to transition to the event-info page 685, which is shown in the second stage 1452.

As shown, the event-info page 685 includes the list 690 of participants for the event. The organizer can select any one participant to view the participant photos on a participant-photo page 1270. The second and third stages 1452 and 1453 show the organizer's selection of John Doe from the list 690, and the presentation of the images captured by John Doe on the page 1270. For the organizer, this page 1270 includes a remove-participant control 1405 that when selected, removes the participant whose photos are displayed on the participant-photo page 1270. This control is not presented to the other participants in the event by their corresponding image-sharing applications, because some embodiments only allow the organizer to delete images from the event.

The third stage 1453 shows the organizer selecting the remove-participant control. In response, the organizer is presented with a prompt 1410 that asks the organizer to confirm the removal of the selected participant and his photos from the event. The fourth stage 1454 shows the user confirming this decision. The fifth stage 1455 then shows that the selected participant (John Doe) has been removed from the list of event participants 690. The fifth stage 1455 also shows the organizer selecting the control 636 to return to the event-image page 170. As shown in the sixth stage, the photos of the removed participant (e.g., photo 1430) are now removed from the event-image page 170.

To remove a participant from the event, the image-sharing application of the organizer's device sends the participant's identity to the server set, which then directs all the devices in the event to delete the participant from their list 690 of the participants and delete the photos of the identified participant from their devices. Also, in some embodiments, the server set records data in its data store to indicate that the participant has been removed from the event. In some of these embodiments, if the removed participant tries to join the event at a later time, the server set checks its records and denies this request once it determines that the participant has been removed from the event. Some embodiments prevent a participant from joining only after the participant has been removed more than a particular number of times. This ensures that the organizer does not accidentally prevent someone from participating by inadvertently removing them once.

Although FIG. 14 illustrates one manner for removing a participant from an event, other embodiments employ other techniques to remove a participant. For instance, some embodiments include an affordance for removing a participant next to the participant's identity in the participant list 690. This affordance is always displayed in some embodiments, while it can be invoked for display (e.g., through the selection of an edit control) in other embodiments.

Figure 15:
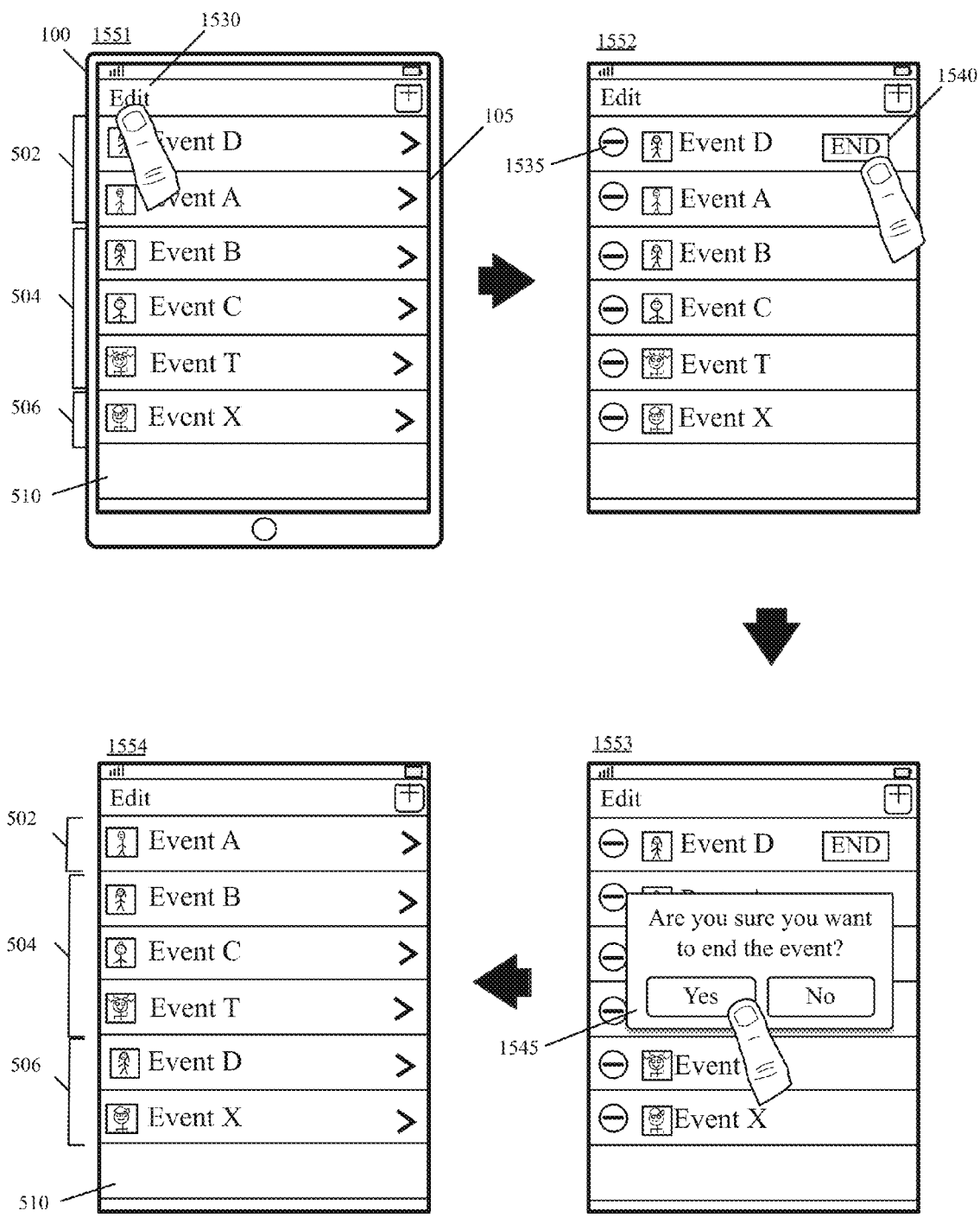
FIG. 15 illustrates an example of terminating an event within an image-sharing application.
Figure 16:
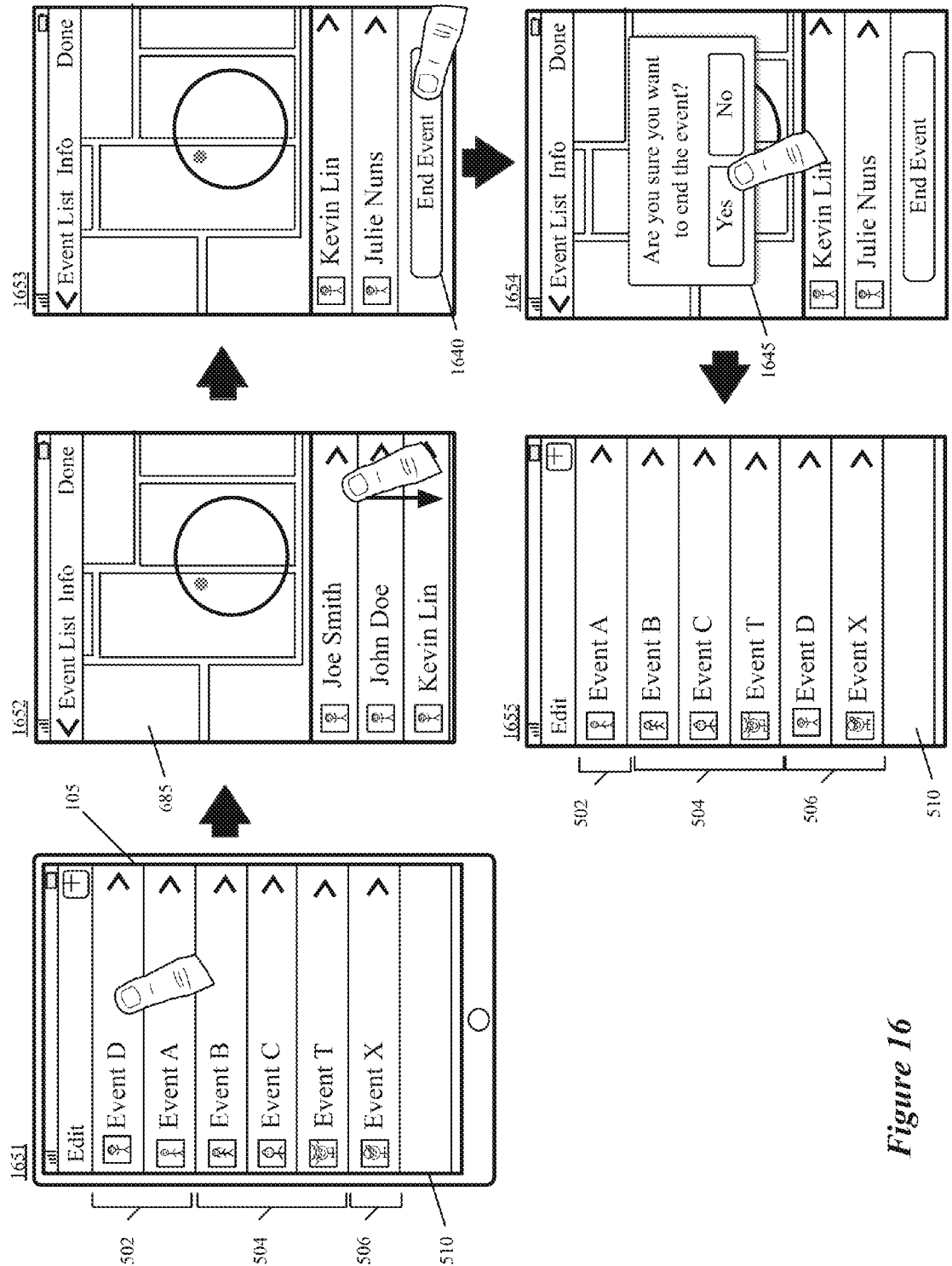
FIG. 16 illustrates another example of terminating an event within an image-sharing application.

In some embodiments, the image-sharing application provides one or more controls to end an event. FIGS. 15 and 16 illustrate two different sets of controls that are provided by some embodiments to end an event. An image-sharing application uses both these sets of controls in some embodiments, while employing only one of them in other embodiments. Also, in some embodiments, the image-sharing application provides other controls for ending an event.

FIG. 15 illustrates an approach of ending an event from the event list 510. This approach is illustrated in terms of four operational stages 1551-1554 of the UI 105. The first stage 1551 shows the application UI 105 displaying the event list 510, which, as mentioned above, includes (1) active events 502 that the device 100 previously organized or joined, (2) nearby candidate events 504 that are near the current location of the device 100 and that the device 100 has not yet joined, and (3) inactive events 506 that the device 100 previously joined and that terminated within a particular time period of when the list is being presented.

The first stage 1551 shows the user selecting an event edit control 1530. In some embodiments, the UI 105 provides this control in order to allow any participant to delete an event from the event list. As shown in the second stage 1552, the selection of the edit control 1530 directs the image-sharing application (1) to display a delete control 1535 next to each even on the event list, and (2) to display an end control 1540 next to any event that the user of the device 100 organized. In this example, the user has organized the Event D, and hence the end control 1540 appears next to this event.

By selecting the delete control 1535 that appears next to an event, the user can direct the application to delete that event. For instance, in some embodiments, the selection of the delete control 1535 causes the application to present (e.g., next to the event) a delete button that the user can then select to confirm the deletion of event from the list of events. Upon the user's selection of the delete control 1535, the application then deletes the event from the list. Some embodiments do not allow the event participants to delete events from the event list 510. In these embodiments, events only disappear from the event list 510 after inactive events 506 have expired (i.e., have been inactive for a sufficient duration of time for the server set or the image-sharing applications to remove it from the devices of the participants of the event).

The second stage 1552 shows the user selecting the end control 1540 for the Event D, which is an event that the user has organized. As the organizer of the event, the user is allowed in some embodiment to end an event. These embodiments do not allow the other participants of the event to end the event. However, other embodiments may allow some or all of the event participants to end an event.

The third stage 1553 shows that in response to the user's selection of the end control 1540, the application presents a prompt 1545 to ask the user to confirm his intention to end the Event D. The third stage 1553 shows the user confirming his intention. In response to this, the application informs the server set that the organizer has terminated the event, and its status should be changed to inactive.

In response, the server set sends each participating device (i.e., each device participating in the event) a communication that the event is now inactive. The image-sharing application of each device then changes the status of the event from active to inactive, which, as shown in the fourth stage 1554, results in the movement of this event from the group 502 of previously organized or joined active events on the event list 510 to the group 506 of previously organized or joined inactive events on this list.

FIG. 16 illustrates alternative approach for ending an event. This approach is illustrated in terms of five operational stages 1651-1655 of the UI 105 of the image-sharing application of some embodiments. The first stage 1651 shows the application UI 105 displaying the event list 510. This stage also shows the user selecting Event D, which, in this example, is an event that the user has organized. Again, some embodiments only allow an event organizer to end an event.

The second stage 1652 shows that in response to the selection of Event D, the image-sharing application presents the event-info page 685 for the Event D. This stage also shows the user scrolling down the list of participants for this event. The third stage 1653 then shows that for the organizer of an event, the photo-sharing application includes an end control 1640 for ending the event and places this control at the end of the list of event participants on the event-info page 685, in some embodiments.

The third stage 1653 shows the user selecting the end control 1640. The fourth stage 1654 shows that in response to the user's selection of the end control 1640, the application presents a prompt 1645 to ask the user to confirm his intention to end the Event D. The fourth stage 1654 shows the user confirming his intention. In response to this, the application informs the server set that the organizer has terminated the event, and its status should be changed to inactive. As in the example of FIG. 15, the server set in the example of FIG. 16 sends each participating device (i.e., each device participating in the event) a communication that the event is now inactive, and the image-sharing application of each device then changes the status of the event from active to inactive. As shown in the fifth stage 1655, the changing status of Event D results in the movement of this event from the group 502 of active events to the group 506 of inactive events on event list 510.

Figure 17:
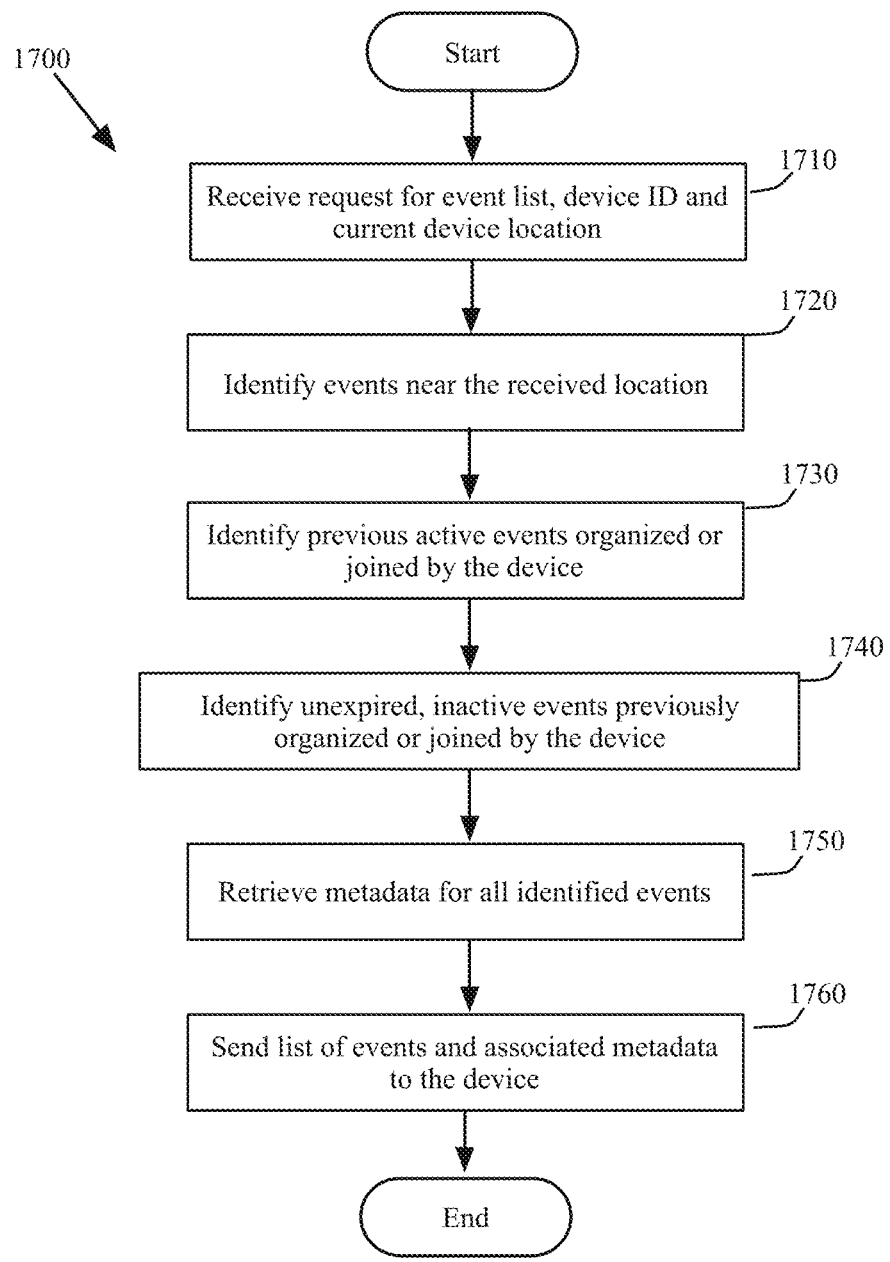
FIG. 17 conceptually illustrates a process that some embodiments create an event list for a device.

Several processes that are performed by the servers set 410 will now be described by reference to FIGS. 17-21. FIG. 17 conceptually illustrates a process 1700 that the server set performs in some embodiments in order to provide a device with a list of events. The server set performs this process 1700 each time a device contacts it for an updated list of events that include events previously joined by the device as well as nearby candidate events. In some embodiments, one server in the server set performs this process, while in other embodiments different servers in the server set perform this process to handle different event-list requests that are received by the server set.

As shown in FIG. 17, the process 1700 initially receives (at 1710) a request for the event list from the device. This request is accompanied with the device's identity and the current location of the device. To identify events that are near the supplied location, the process 1700 searches (at 1720) a data store of events that the server set maintains. In some embodiments, the server set indexes this data store (e.g., this database) at least partially based on location data, in order to be able to identify events quickly based on the location data that the devices supply.

In different embodiments, the process 1700 employs different techniques to supply a set of nearby candidate events to the device. In some embodiments, the process supplies to the device all the events that are within a certain threshold distance of the device, and leaves it to the device's image-sharing application to identify the nearby candidate events that have to be displayed to the user based on the device's current location. In other words, in these embodiments, the image-sharing application has the task of determining whether the device meets the location criteria for displaying, in the displayed event list, a supplied nearby candidate event (e.g., determining whether the device falls within the organizer-specified boundary of a nearby candidate event, or falls within an acceptable halo boundary of the event for the embodiments that display an event even when the device falls outside of the organizer-specified boundary).

In other embodiments, the process 1700 only supplies to the device the nearby candidate events that have organizer-specified regions in which the device currently falls. In addition to these nearby candidate events, the process 1700 in still other embodiments, also supplies to the device a nearby candidate event when the device falls within an acceptable halo boundary about the event's organizer-specified boundary. Accordingly, in these embodiments, the process 1700 has the task of identifying the nearby candidate events to display to the device. This is because in these embodiments, the process 1700 has the task of determining whether the device meets the location criteria for displaying, in the displayed event list, a supplied nearby candidate event (e.g., determining whether the device falls within the organizer-specified boundary of a nearby candidate event, or falls within an acceptable halo boundary of the event for the embodiments that display an event even when the device falls outside of the organizer-specified boundary).

After identifying the nearby candidate events to supply to the device, the process 1700 then identifies (at 1730) active events that the device organized or joined previously. The process identifies (at 1730) these events by searching one or more data stores that the server set maintains to store information about the active events that are associated with the requesting device (i.e., the device that sent the event-request list that initiated the process 1700).

Next, the process identifies (at 1740) inactive events that the device organized or joined previously, and that have not yet expired. The process identifies (at 1740) these events by searching one or more data stores that the server set maintains to store information about the inactive events that are associated with the requesting device At 1750, the process retrieves metadata for all of the identified events (i.e., the events identified at 1720, 1730, and 1740) from one or more data stores that the server set maintains in some embodiments. This metadata includes the name of the event, the name and other identifiers of the participants of the event, the status of the event, etc. Lastly, at 1760, the process sends a list of all the identified events and their gathered metadata to the requesting device, and then ends.

While the event gathering process 1700 has been described by reference to numerous details, one of ordinary skill will realize that this process can be implemented in other embodiments. For instance, in some embodiments, the process does not gather data about previously joined or organized events, and/or does not supply previously gathered and supplied metadata about these previous events, because the requesting device's image-sharing application has a record of this data from previous iterations when it received the data. Hence, in these embodiments, the process 1700 only gathers and supplies the data that it has not previously provided to the device. In some embodiments, however, the process gathers and supplies event data that it has previously provided to the device, because the device can use the supplied data to double check its records in order to ensure that the server set and the device have consistent data. Also, these embodiments also supply a complete data set because they account for the device not being available when data about the device's associated events is being pushed.

Figure 18:
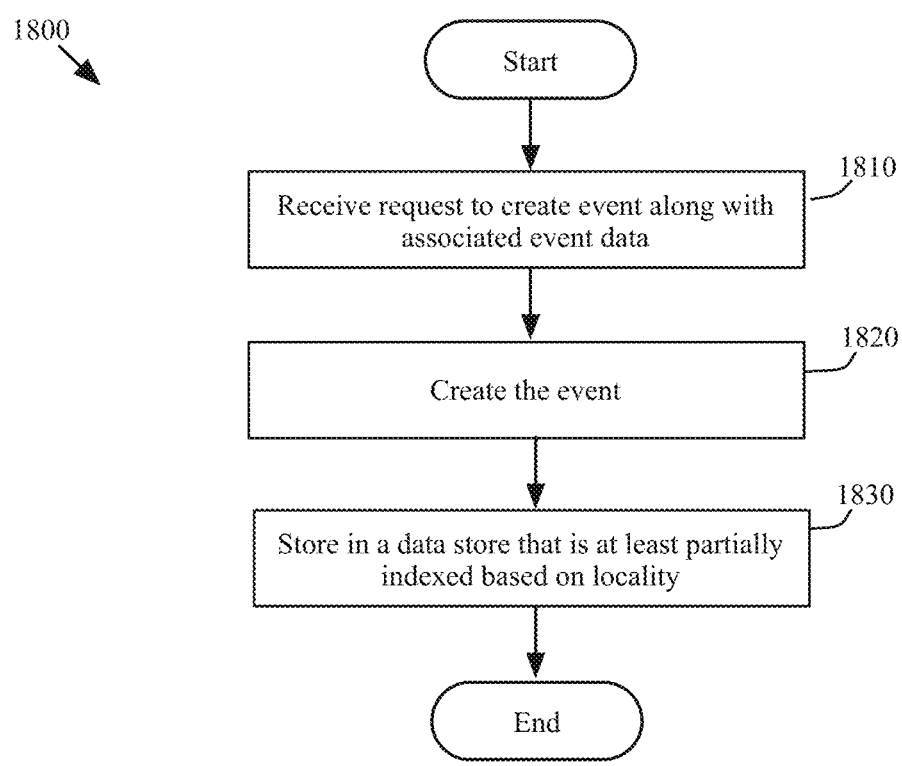
FIG. 18 conceptually illustrates a process that some embodiments perform to create an event.

FIG. 18 conceptually illustrates a process 1800 that the server set performs in some embodiments in order to create an event for a specified region. In some embodiments, one server in the server set performs this process, while in other embodiments different servers in the server set perform this process to handle different create-event requests that are received by the server set.

As shown, the process 1800 initially receives (at 1810) a request to create an event for a region from the device of the organizer of the event. This request is accompanied by the definition of the region. As mentioned above, the organizer's device in some embodiments defines the region with latitude/longitude pair that defines the center of a circle, and a value that is the radius of the circle. In other embodiments, this device can define a circular region differently, or it can use another shape (e.g., a polygon, an ellipse, etc.) and shape definition to specify the event's associated region.

The process 1800 creates (at 1820) an event for the specified region, and then stores (at 1830) this event in a data store (e.g., a database) that stores the organized image-sharing events. In some embodiments, this data store is at least partially indexed based on the localities of the events, so that the process 1700 can be able to identify events quickly based on the location data that the devices supply.

In this data store, the process 1800 stores metadata regarding the created event, and/or creates references to other data stores that store metadata regarding this event. In some embodiments, this metadata includes not only region-definition data, but also includes data (e.g., name, photo, etc.) relating to the organizer of the event, the time the event was organized, etc. As participants join the event, this metadata is augmented to include data about the participants.

After 1830, the process ends.

As illustrated in FIG. 18, the process 1800 does not perform any checks to determine whether the organizer can create the requested event for the requested location. However, in other embodiments, the process 1800 would perform such a check. For instance, in some embodiments, the process 1800 would ensure that the requested event's region does not overlap too much with the region of a previously specified event. In other embodiments, the process 1800 does not perform such a check, as it lets multiple organizer's define multiple events for the same or similar region.

As mentioned above, some embodiments place location criteria that limits the specified location for an event based on the location of the organizer's device. For instance, some embodiments prevent an organizer from specifying an event for a region that does not contain the organizer's current location or that is too far from the organizer's current location. The image-sharing application performs this location check in some embodiments. In other embodiments, this location check is performed by the process 1800 of the server set.

Figure 19:
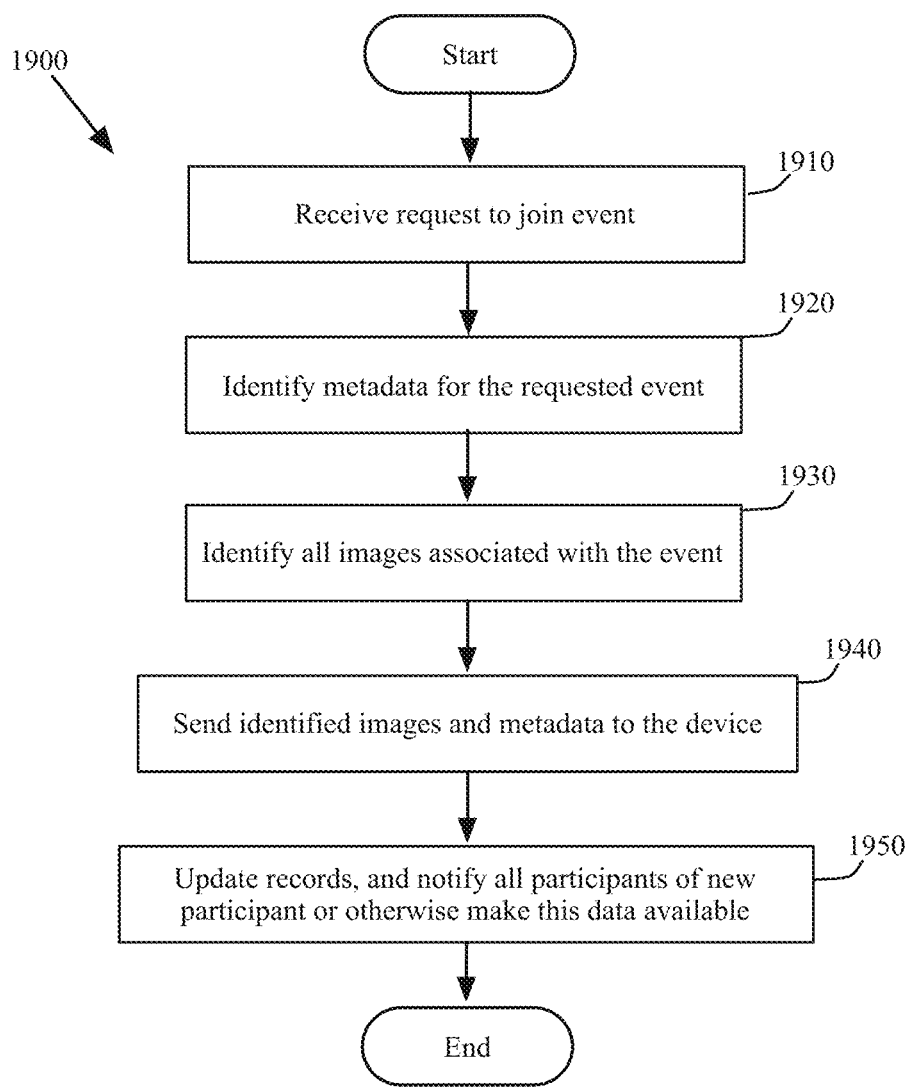
FIG. 19 conceptually illustrates a process that some embodiments perform in order to add a device as a participant of a previously organized event.

FIG. 19 conceptually illustrates a process 1900 that the server set performs in some embodiments in order to handle a request to join an event from the device of a user who wishes to participate in the event. In some embodiments, one server in the server set performs this process, while in other embodiments different servers in the server set perform this process to handle different join requests that are received by the server set.

As shown, the process 1900 receives (at 1910) the request to join an event from a user's device. This request is accompanied by an event identity (e.g., an event number), which in some embodiments is part of the metadata that the process 1700 provided to the requesting device when the process 1700 was providing an event list for the device to display. As further described below, the process 1900 uses the supplied event identity to retrieve data about the event, which it then supplies to the requesting device.

For a device to be able to join an event, the device has to meet certain location criteria with respect to the region that is specified for the event. For instance, some embodiments allow the device to join only if the device is within the event's region, while other embodiments allow the device to join if the device is within the event's region or within an acceptable halo boundary about this region.

In some embodiments, the process 1900 performs a check to ensure that the requesting device satisfies the location criteria for the requested event. However, as shown in FIG. 19, the process 1900 does not perform this check in other embodiments. This is because in these embodiments, the image-sharing application of the requesting device performs this check. In other words, in these embodiments, the requesting device would not allow its user to submit a join request, or would not send its user's join request to the server set, when the device's current location does not satisfy the location criteria for joining the desired event.

After 1910, the process uses (at 1920) the supplied event identity to identify and gather metadata for the requested event. In some embodiments, this metadata includes data (e.g., names, photos, etc.) of the other participants of the event. In some embodiments, the server set provided some amount of this metadata when it sent the event data in the event list that the process 1700 supplied. In some of these embodiments, the metadata supplied by the process 1900 is a more complete set of metadata, which may or may not overlap with the previously supplied metadata. In other embodiments, the process 1900 does not gather (at 1920) metadata because the process 1700 previously provided all the requisite metadata regarding the event.

The process 1900 gathers (at 1930) all captured photos that the server set currently stores for the specified event, and supplies (at 1940) the gathered metadata and photos for the event to the device that has requested to join the event. Next, at 1950, the process updates its records to identify the requesting device or its user as a new participant to the event, and informs other event participants of the addition of the requesting device and/or its user as a new participant to the event. In informing these other participants of the addition of a new participant, the process 1900 provides metadata (e.g., name, photo, etc.) that describes the new participant to the previous participants.

After 1950, the process ends.

As illustrated in FIG. 19, the process 1900 in some embodiments does not interact with the organizer of the event to determine whether the participant can join the event. However, in other embodiments, the process 1900 performs an access control sub-process in which it communicates with the event organizer to determine whether the requesting user can join the event. In some embodiments, this access control sub-process is performed after 1910 and before the process 1900 supplies any event photos at 1940 to the requested participant. When the organizer rejects the request, the process 1900 informs the requested participant the rejection and then ends.

Figure 20:
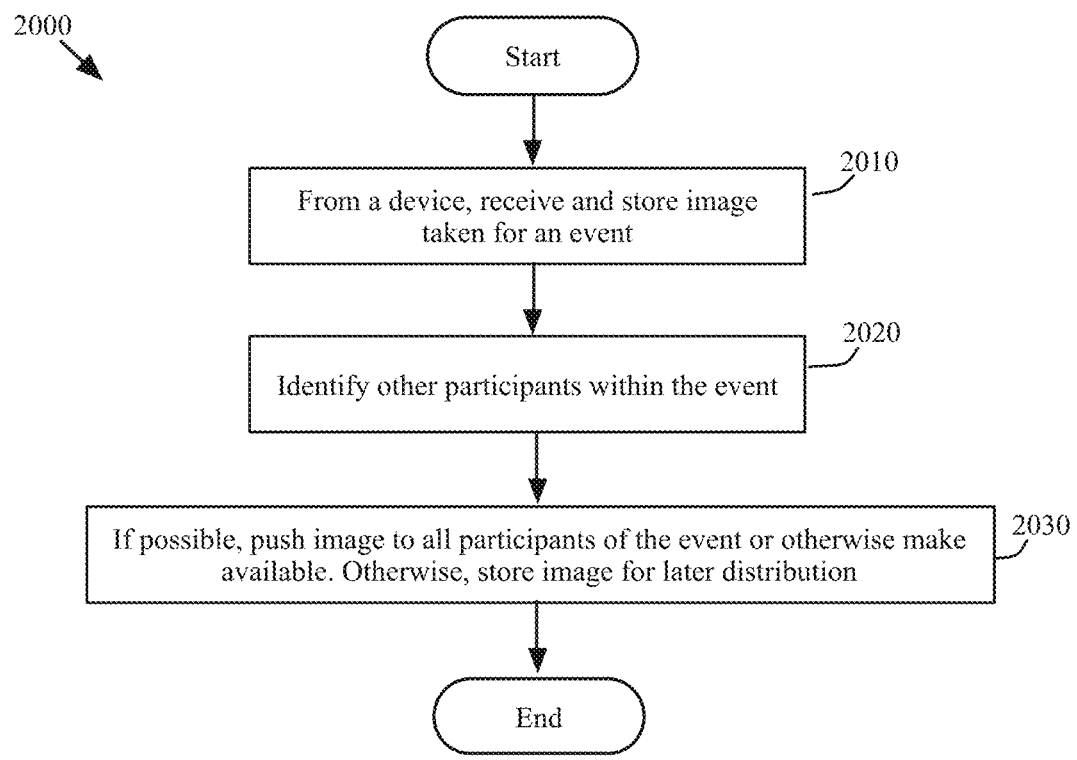
FIG. 20 conceptually illustrates a process for storing and distributing a captured image.

FIG. 20 conceptually illustrates a process 2000 that the server set performs in some embodiments in order to distribute an image that has been captured for a particular event. In some embodiments, one server in the server set performs this process, while in other embodiments different servers in the server set perform this process to handle distribution of different photos that are received by the server set.

As shown, the process 2000 initially receives (at 2010) a photo captured for the particular event by one of the event participants. At 2010, the process also stores a copy of the captured photo in a data store. The process uses this stored copy to provide this event photo to participants that later join the event.

Next, at 2020, the process identifies all the other participants of the particular event. At 2030, the process distributes the received, captured photo to the other participants of the particular event if they are available to receive the photo. If a participant is not available when the process is distributing the photo to everyone else, the process stores (at 2030) a record to indicate that the server set needs to provide the captured photo at a later time to the currently unavailable participant, once that participant become available. A participant might be unavailable when his device is off, or when his image-sharing application is not running and does not employ a background service to receive updates for it while it is not running.

After 2030, the process ends.

The process 2000 employs different distribution mechanisms in different embodiments to distribute the image content that it gets. For instance, in some embodiments, the process 2000 distributes images in the same format and resolution as it receives them. However, in other embodiments, the process 2000 changes the resolution and/or format of the images before distributing them. For example, in some embodiments, the process 2000 might receive captured images at a higher resolution and distribute the captured images at a lower resolution, in order to conserve the network bandwidth consumption of the devices receiving the captured images. In some of these embodiments, the server set supplies the higher resolution version of an image to a device when the user of the device wants to save a copy of the image or distribute a copy of the image. In these instances, the server set supplies the higher resolution version because the user has revealed a specific interest in the image.

As mentioned above, the process 2000 distributes not only photo content in some embodiments, but also distributes other image content (e.g., video content, burst photo content, etc.) in other embodiments. However, to conserve network bandwidth, the process 2000 employs different distribution rules in different embodiments to distribute the different types of content. For instance, in some embodiments, the process 2000 distribute captured photos in the same resolution as it receives them, but it distributes the captured videos in a lower resolution as it receives them. In fact, in some embodiments, the process 2000 only distribute small snippets of the captured video initially, and waits for the receiving participants to indicate a desire to see or download the rest of the video before downloading the rest of the video.

Figure 21:
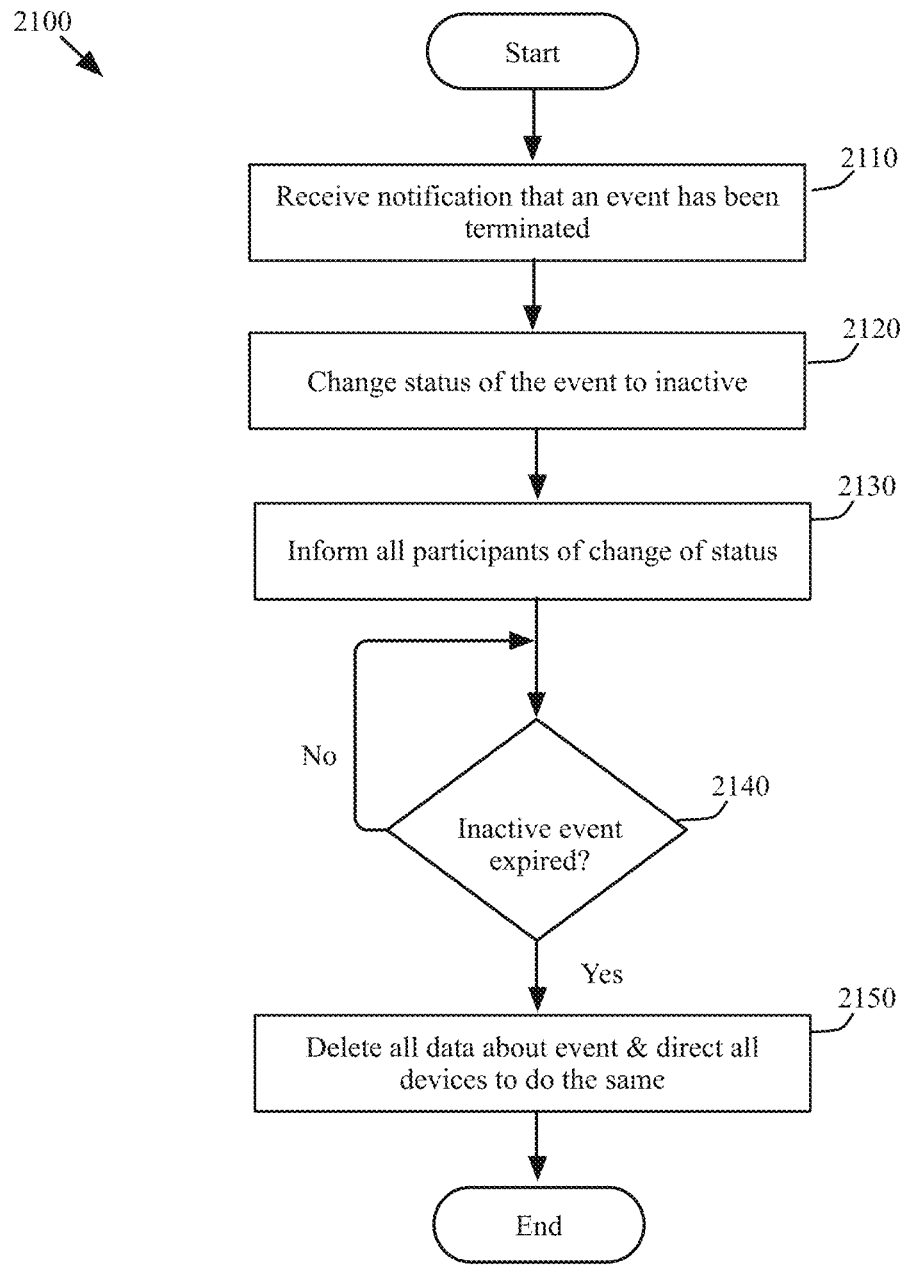
FIG. 21 conceptually illustrates a process that some embodiments perform to make an event inactive and later to delete the event.

FIG. 21 conceptually illustrates a process 2100 that the server set performs in some embodiments in order to handle termination of events. In some embodiments, one server in the server set performs this process, while in other embodiments different servers in the server set perform this process to handle termination of different events.

As shown, the process 2100 initially receives (at 2110) a notification from an organizer of an event that the event has been terminated. In some embodiments, other event participants can also terminate an event. Alternatively, or conjunctively, an event can be terminated automatically upon expiration of a timer maintained by the server set or by the organizer's image-sharing application.

After 2110, the process changes (at 2120) the status of the event from active to inactive. Next, at 2130, the process sends a notification to all the participating devices of the event that the event has now become inactive. The participating device can then use this information to display this event as inactive and to prevent their users from capturing photos for this event (e.g., by removing the camera affordance on the event-image page).

The process then transitions to 2140, where it remains until a time period for the inactive event expires. This time period is the time period for maintaining the inactive event available to all the event participants, so that they can continue to view, save and distribute the captured images for the inactive event. In some embodiments, this time period is measured in days, weeks, or months.

Once the process 2100 determines (at 2140) that the inactive event's timer has expired, it deletes (at 2150) all records, photos and metadata of the event from the server set, and informs all of the participating devices to do the same. When a participant device is not available to receive this notification with all the other participants, the process stores a record to indicate that the server set needs to provide this notification at a later time to the currently unavailable participant once that participant become available. As mentioned above, a participant might be unavailable when his device is off, or when his image-sharing application is not running and does not employ a background service to receive updates for it while it is not running.

Figure 22:
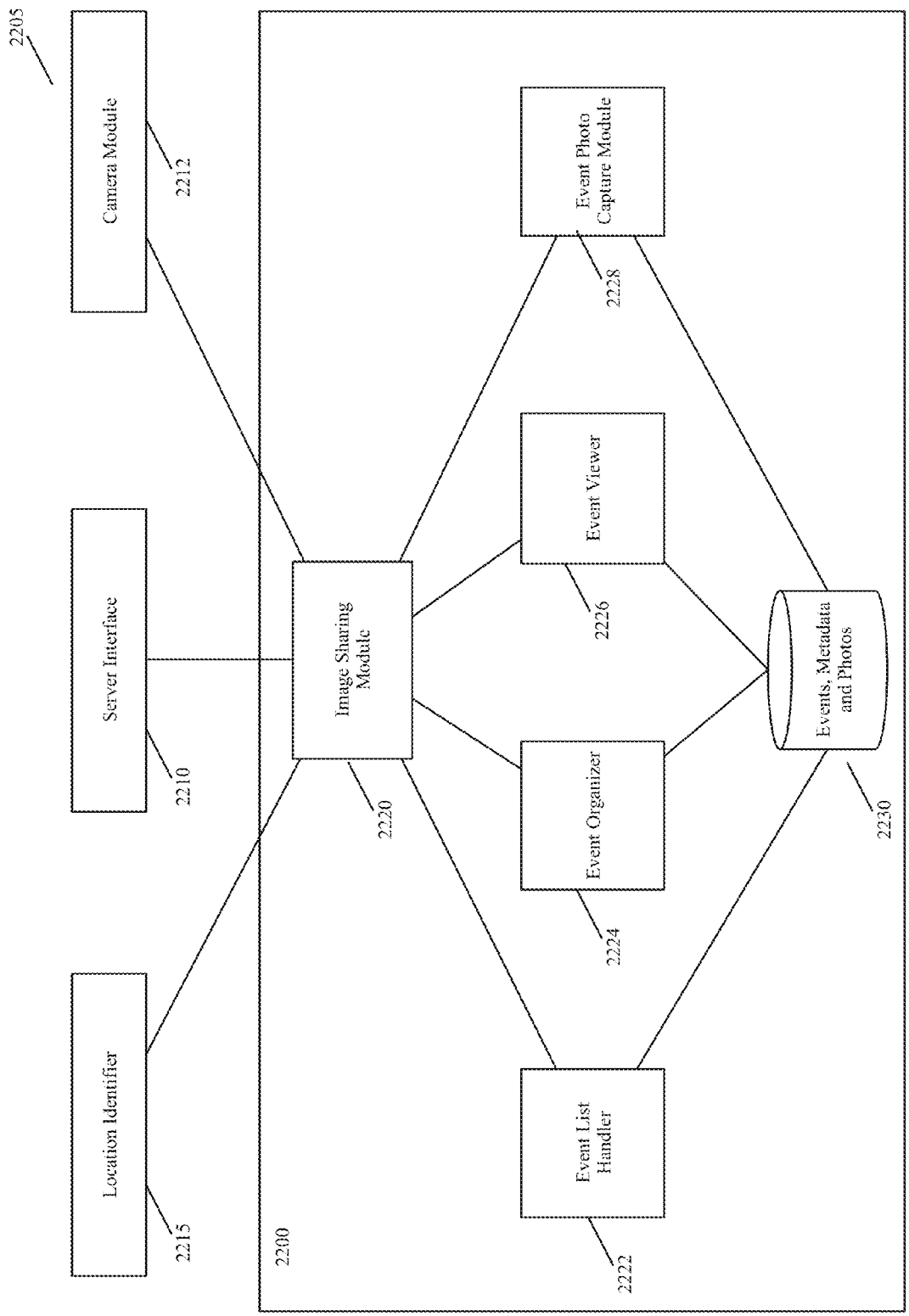
FIG. 22 conceptually illustrates the software block diagram of the image-sharing application of some embodiments.

FIG. 22 conceptually illustrates a software architecture block of the image-sharing application 2200 of some embodiments of the invention. This figure also illustrates three modules 2210, 2212, and 2215 of a device 2205 on which the application 2200 executes. These modules are a server interface module 2210, a camera module 2212, and a location identifying module 2215. As shown, the application 2200 includes an image-sharing module 2220, an event list handler 2222, an event organizer 2224, an event viewer 2226, an event photo capture module 2228, and one or more data stores 2230 for storing events, metadata about the events and photos for the events.

In some embodiments, the image-sharing module 2220 is the module that initiates the operation of the image-sharing application, and interfaces with the device's sever interface 2210 to exchange communication with the server set 410. This module also interfaces with other services of the device, such as location service(s) 2215 and camera module 2212. Also, as shown, the image-sharing module 2220 coordinates communication between the other modules 2222-2228 of the image-sharing application. In other embodiments, one or more of these other modules 2222-2228 directly communicate with each other and/or with one or more of the device service modules 2210, 2212, and 2215. Also, in some of these embodiments, some or all of the operations of the image sharing module 2220 are performed by one of these other application modules 2222-2228 (e.g., by the event list handler 2222).

The event list handler 2222 is in charge of displaying an event list 510 that contains nearby candidate events as well as previously joined or organized events, which may be active or inactive. In some embodiments, the handler 2222 is called (e.g., by the image sharing module 2220) whenever the application starts and whenever the event list has to be updated. The handler 2222 then initiates communication with the server set 410 (e.g., through the image sharing module and the server interface 2210) to obtain an event list, as described above by reference to FIGS. 5, 6, and 17.

In obtaining the event list from the server, the event list handler 2222 or the image sharing application 2220 obtains the location of the device from the location service(s) 2215 of the device in some embodiments. The location service(s) of the device includes one or more of the following: a global positioning system (GPS) service, a WiFi location service, cellular location service, etc. These services also include map services that provide maps of localities. As further described below, the image-sharing application uses one or more of these services to obtain location data each time it needs to identify the location of the device, identify nearby events and maps of the regions of these events, enforce location criteria for joining events and posting images for these events.

The event list handler 2222 also is in charge of responding to user interactions with the event list page 510 that the event list handler presents. As mentioned above by reference to FIG. 6, one of the user interactions on this page is the selection of add-event button 512. Once this button is selected, the event list handler 2222 calls the event organizer 2224 indirectly through the image-sharing module 2220 (as shown in FIG. 22), or directly itself.

In response, the event organizer 2224 handles the user and server interaction while the user is defining a new event. Exemplary user interactions to create an event were described above by reference to FIG. 5, while exemplary server interactions to create an event were described above by reference to FIG. 18. The event organizer 2224 processes these user and server exemplary interactions in some embodiments.

In organizing an event, the event organizer 2224 obtains the location of the device from the location identifier 2215 of the device directly, or indirectly through the image sharing module 2220. In some embodiments, the organizer then uses the device's location to determine whether the device meets the location criteria for organizing the requested event for a particular location.

Other user interactions that can be initiated from the event-list page 510 include selecting a previously joined or organized event and selecting a new event to join. In response to these actions, the event list handler 2222 calls the event viewer 2226 indirectly through the image-sharing module 2220 (as shown in FIG. 22), or directly itself. The event viewer handles the user and server interaction while the user is joining a new event, viewing a previous event, or viewing the captured images for an event. Exemplary user interactions to join a new event were described above by reference to FIG. 6, while exemplary server interaction to add a participant to an event were described above by reference to FIG. 19. Also, exemplary user interaction to view previously joined or organized events and their captured images were described above by reference to FIGS. 10-12. The event viewer 2226 processes these exemplary user and server interactions in some embodiments.

During the viewing of event-image page 170 for an active event, the event viewer 2226 presents the inline camera control 172 to allow the user to capture and post an image for the event. When the user selects this control, the event viewer 2226 calls the event image capture module 2228 indirectly through the image-sharing module 2220 (as shown in FIG. 22), or directly itself. In response, the image capture module 2228 handles the user and server interaction while the image-sharing application operates in its camera modality.

In some embodiments, the camera module 2212 of the device 2205 facilitates the operation of this modality. Accordingly, in these embodiments, the image capture module 2228 interacts with the camera module 2212 to obtain image sensor data for display of preview images, to define camera modes (e.g., photo mode, video mode, burst mode), to define special effects to apply to the captured images, and to capture images.

Exemplary user interactions during the application's camera modality were described above by reference to FIG. 13, while exemplary server interaction to distribute a capture image were described above by reference to FIG. 20. The image capture module 2228 processes these exemplary user and server interactions in some embodiments.

In capturing and posting images for an event, the capture module 2228 enforces location criteria that limits where the device can capture and post images for an event (e.g., limits the image capture to be within the event's region or within a certain threshold distance of the event's region). To enforce this location criteria, the capture module needs to know the location of the device, which it obtains directly from the location identifier 2215 in some embodiments, or indirectly through the image sharing module 2220 in other embodiments.

As shown in FIG. 22, all the modules 2222-2228 access one or more data stores 2230 that store events, metadata about the events and photos for the events. In some embodiments, access to this data store for one or more of these modules is through the image-sharing module 2220, or through another one of the modules 2222-2228.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
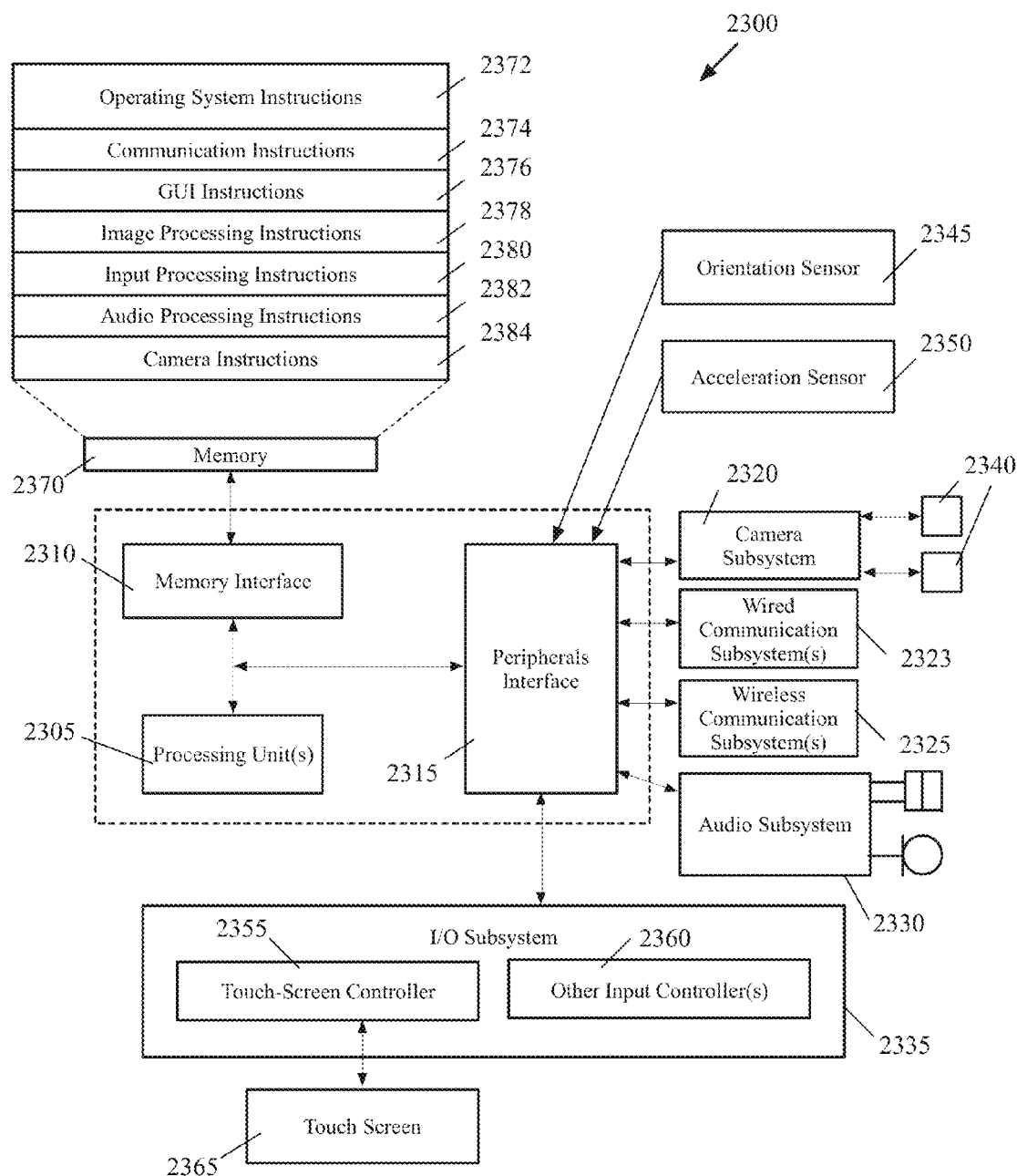
FIG. 23 illustrates an example of an architecture of a mobile computing device.

The applications of some embodiments operate on mobile devices, such as smart phones (e.g., iPhones®) and tablets (e.g., iPads®). FIG. 23 is an example of an architecture 2300 of such a mobile computing device. Examples of mobile computing devices include smartphones, tablets, laptops, etc. As shown, the mobile computing device 2300 includes one or more processing units 2305, a memory interface 2310 and a peripherals interface 2315.

The peripherals interface 2315 is coupled to various sensors and subsystems, including a camera subsystem 2320, a wireless communication subsystem(s) 2325, an audio subsystem 2330, an I/O subsystem 2335, etc. The peripherals interface 2315 enables communication between the processing units 2305 and various peripherals. For example, an orientation sensor 2345 (e.g., a gyroscope) and an acceleration sensor 2350 (e.g., an accelerometer) is coupled to the peripherals interface 2315 to facilitate orientation and acceleration functions.

The camera subsystem 2320 is coupled to one or more optical sensors 2340 (e.g., a charged coupled device (CCD) optical sensor, a complementary metal-oxide-semiconductor (CMOS) optical sensor, etc.). The camera subsystem 2320 coupled with the optical sensors 2340 facilitates camera functions, such as image and/or video data capturing. The wireless communication subsystem 2325 serves to facilitate communication functions. In some embodiments, the wireless communication subsystem 2325 includes radio frequency receivers and transmitters, and optical receivers and transmitters (not shown in FIG. 23). These receivers and transmitters of some embodiments are implemented to operate over one or more communication networks such as a GSM network, a Wi-Fi network, a Bluetooth network, etc. The audio subsystem 2330 is coupled to a speaker to output audio (e.g., to output voice navigation instructions). Additionally, the audio subsystem 2330 is coupled to a microphone to facilitate voice-enabled functions, such as voice recognition (e.g., for searching), digital recording, etc.

The I/O subsystem 2335 involves the transfer between input/output peripheral devices, such as a display, a touch screen, etc., and the data bus of the processing units 2305 through the peripherals interface 2315. The I/O subsystem 2335 includes a touch-screen controller 2355 and other input controllers 2360 to facilitate the transfer between input/output peripheral devices and the data bus of the processing units 2305. As shown, the touch-screen controller 2355 is coupled to a touch screen 2365. The touch-screen controller 2355 detects contact and movement on the touch screen 2365 using any of multiple touch sensitivity technologies. The other input controllers 2360 are coupled to other input/control devices, such as one or more buttons. Some embodiments include a near-touch sensitive screen and a corresponding controller that can detect near-touch interactions instead of or in addition to touch interactions.

The memory interface 2310 is coupled to memory 2370. In some embodiments, the memory 2370 includes volatile memory (e.g., high-speed random access memory), non-volatile memory (e.g., flash memory), a combination of volatile and non-volatile memory, and/or any other type of memory. As illustrated in FIG. 23, the memory 2370 stores an operating system (OS) 2372. The OS 2372 includes instructions for handling basic system services and for performing hardware dependent tasks.

The memory 2370 also includes communication instructions 2374 to facilitate communicating with one or more additional devices; graphical user interface instructions 2376 to facilitate graphic user interface processing; image processing instructions 2378 to facilitate image-related processing and functions; input processing instructions 2380 to facilitate input-related (e.g., touch input) processes and functions; audio processing instructions 2382 to facilitate audio-related processes and functions; and camera instructions 2384 to facilitate camera-related processes and functions. The instructions described above are merely exemplary and the memory 2370 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 23 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 23 may be split into two or more integrated circuits.

Figure 24:
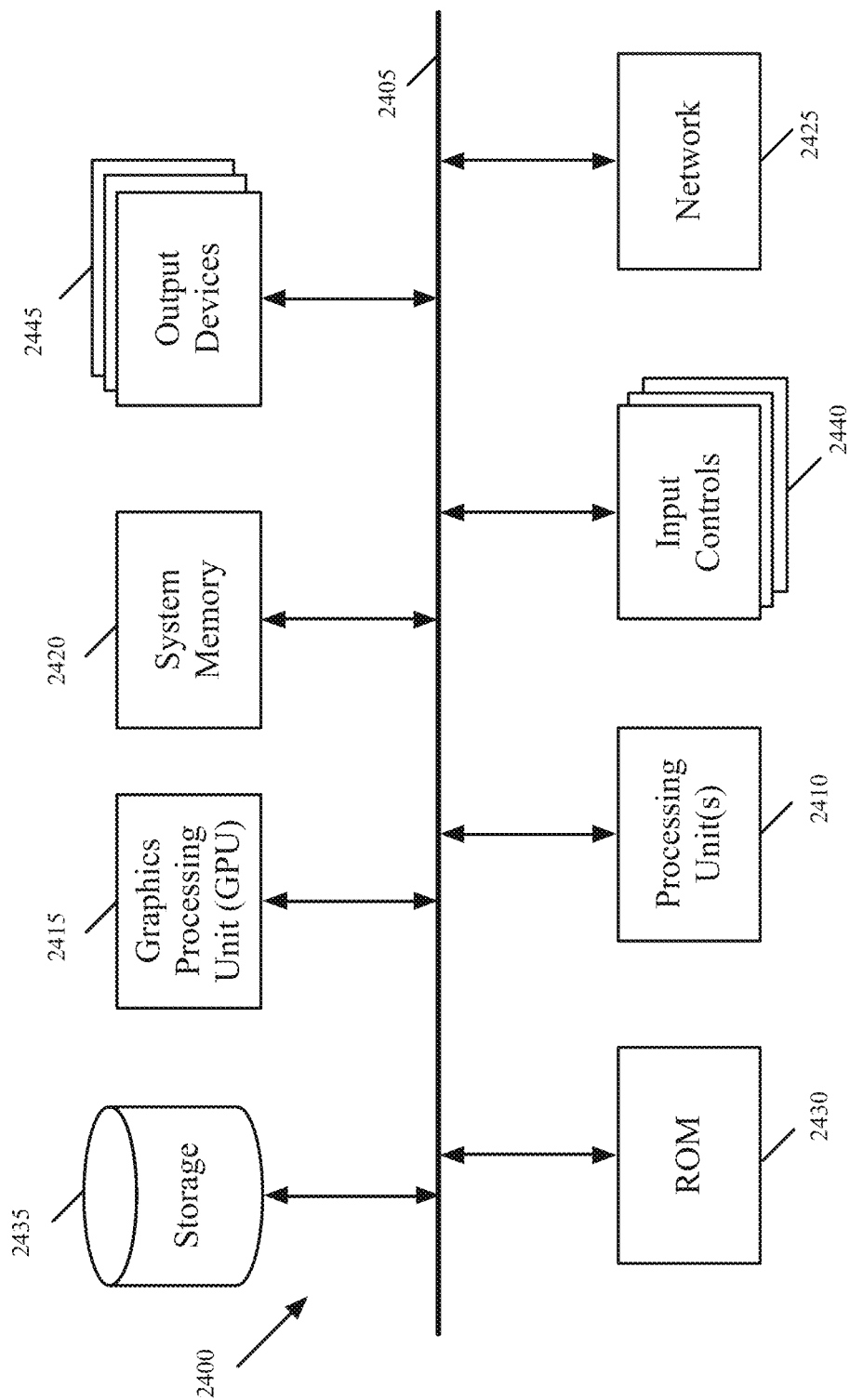
FIG. 24 illustrates an example of an electronic system with which some embodiments of the invention are implemented.

FIG. 24 conceptually illustrates another example of an electronic system 2400 with which some embodiments of the invention are implemented. The electronic system 2400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive, integrated flash memory) as the permanent storage device 2435.

Other embodiments use a removable storage device (such as a floppy disk, flash memory device, etc., and its corresponding drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alpha-numeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet), or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 25:
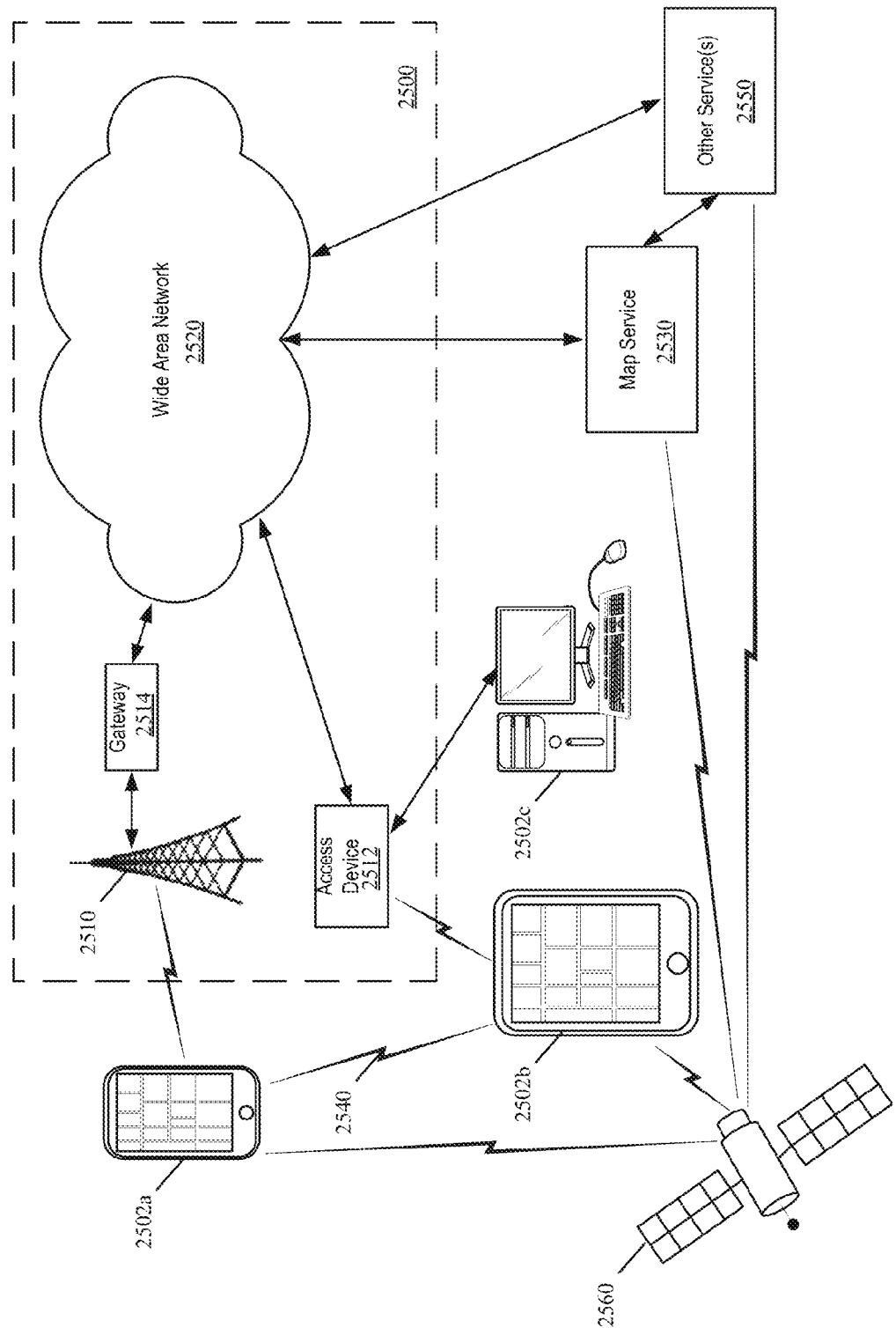
FIG. 25 illustrates a map service operating environment, according to some embodiments.

Various embodiments may operate within a map service operating environment. FIG. 25 illustrates one possible embodiment of an operating environment 2500 for a map service (also referred to as a mapping service) 2530 and client devices 2502a-2502c. In some embodiments, devices 2502a, 2502b, and 2502c communicate over one or more wired or wireless networks 2510. For example, wireless network 2510, such as a cellular network, can communicate with a wide area network (WAN) 2520, such as the Internet, by use of gateway 2514. A gateway 2514 in some embodiments provides a packet oriented mobile data service, such as General Packet Radio Service (GPRS), or other mobile data service allowing wireless networks to transmit data to other networks, such as wide area network 2520. Likewise, access device 2512 (e.g., IEEE 802.11g wireless access device) provides communication access to WAN 2520.

The client devices 2502a and 2502b can be any portable electronic or computing device capable of communicating with a map service (e.g., smart phone, tablet, laptop computer, etc.). Device 2502c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2502a-2502c are not shown as each accessing the map service 2530 via either the wireless network 2510 and gateway 2514 or the access device 2512, one of ordinary skill in the art will recognize that the client devices of some embodiments may access the map service via multiple different wired and/or wireless protocols.

Devices 2502a-2502c can also establish communications by other means. For example, these devices may communicate with other wireless devices (e.g., other devices 2502b, cell phones, etc.) over the wireless network 2510 or through access device 2512. Likewise the devices 2502a-2502c can establish peer-to-peer communications 2540 (e.g., a personal area network) by use of one or more communication subsystems, such as Bluetooth® communication or similar peer-to-peer protocols.

Devices 2502a-2502c may also receive Global Positioning Satellite (GPS) signals from GPS satellites 2560. In addition, in some embodiments the map service 2530 and other services 2550 may also receive GPS signals from GPS satellites 2560.

A map service 2530 may provide map services for one or more client devices 2502a-2502c in communication with the map service 2530 through various communication methods and protocols. A map service 2530 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2502a-2502c may utilize these map services to obtain the various map service data, then implement various techniques to process the data and provide the processed data to various entities (e.g., internal software or hardware modules, display screens of the client devices, external display screens, or other external systems or devices.

The map service 2530 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2502a-2502c, the map service 2530 of some embodiments, performs various optimization techniques to analyze a map tile before encoding the tile.

In some embodiments, the map tiles are generated by the map service 2530 for different possible display resolutions at the client devices 2502a-2502c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 2530 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2530 responds to requests from the client devices 2502a-2502c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2502a-2502c that obtain map service data from the map service 2530 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2502a-2502c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2530. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2502a-2502c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2530 and/or other service(s) 2550 are configured to process search requests from any of the client devices. Search requests may include but are not limited to queries for businesses, addresses, residential locations, points of interest, or some combination thereof. Map service 2530 and/or other service(s) 2550 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2530 and/or other service(s) 2550 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2530 and/or other service(s) 2550, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2530 and/or other service(s) 2550 provide one or more feedback mechanisms to receive feedback from client devices 2502a-2502c. For instance, client devices may provide feedback on search results to map service 2530 and/or other service(s) 2550 (e.g., feedback specifying ratings, reviews, temporary or permanent business closures, errors etc.); this feedback may be used to update information about points of interest in order to provide more accurate or more up-to-date search results in the future. In some embodiments, map service 2530 and/or other service(s) 2550 may provide testing information to the client device (e.g., an A/B test) to determine which search results are best. For instance, at random intervals, the client device may receive and present two search results to a user and allow the user to indicate the best result. The client device may report the test results to map service 2530 and/or other service(s) 2550 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In FIGS. 1-3 and 5-16, the UI items are presented in pages that are displayed on a mobile device. In other embodiments, the same UI items are presented in other types of display area (such as windows, etc.). Also, the discussion above refers to many of the UI affordances as controls or UI items. As used in this document, the terms affordance, control, item, and button should be construed interchangeably as many of the above-described UI features can be implemented by any number of UI affordances.

For instance, a number of the figures (e.g., FIGS. 17-22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, in numerous examples above, a user is notified of a nearby event by viewing an event list that identifies the nearby events. Other embodiments, however, might use other notification mechanisms to notify a user of a nearby event. For instances, some embodiments might provide notification banners that are presented as pop-up banners on an application (not necessarily the image-sharing application) that operates on the foreground (e.g., that is currently presenting a page on the device's display screen). Alternatively, or conjunctively, some embodiments provide a notification in a notification center of the device, like the notification center of iPhone of Apple Inc. Therefore, one of ordinary skill in the art would understand that the invention is not to be limited by the foregoing illustrative details, but rather is to be defined by the appended claims.

What is claimed is:

1. A method, comprising:
   at a first electronic device with a display:
      determining a current location of the first electronic device;
      in accordance with a determination that the current location of the first electronic device is within a first region associated with a first event, displaying a control for joining the first event in a selectable state in an information user interface for the first event;
      in accordance with a determination that the current location of the first electronic device is outside of the first region and within a second region associated with the first event, wherein the second region is larger than the first region and includes the first region, displaying the control for joining the first event in a non-selectable state in the information user interface for the first event;
      while the information user interface for the first event is displayed, detecting an input at a location that corresponds to the control for joining the first event; and,
      in response to detecting the input at the control for joining the first event:
         in accordance with a determination that the control for joining the first event is in the selectable state:
            replacing display of the information user interface for the first event with display of an image-sharing user interface for the first event;
            adding the first electronic device to the first event; and
            receiving, at the first electronic device, a plurality of images that correspond to the first event, wherein at least a subset of the plurality of images that corresponds to the first event are captured by a second device, distinct from the first electronic device, that has joined the first event; and
            displaying at least some of the plurality of images in the image-sharing user interface for the first event; and,
         in accordance with a determination that the control for joining the first event is in the non-selectable state, forgoing adding the first electronic device to the first event.

2. The method of claim 1, wherein the plurality of images include images that the second device captured outside of the first region and inside the second region.

3. The method of claim 1, wherein the plurality of images include images that the second device captured outside of the second region.

4. The method of claim 1, including, in response to detecting the input at the control for joining the first event, in accordance with the determination that the control for joining the first event is in the non-selectable state, forgoing replacing display of the information user interface for the first event with the image-sharing user interface for the first event.

5. The method of claim 1, including, in response to detecting the input at the control for joining the first event, in accordance with the determination that the control for joining the first event is in the non-selectable state, forgoing receiving the plurality of images that correspond to the first event.

6. The method of claim 1, including:
   prior to displaying the information user interface for the first event, displaying an event list user interface that includes a list of events,
   in accordance with a determination that the current location of the first electronic device is within the second region associated with the first event, displaying the first event in the list of events;
   displaying at least one other event in the list of events, wherein the current location of the electronic device is within a region that corresponds to the at least one other event;
   detecting input at a location that corresponds to the first event in the list of events; and
   in response to detecting the input at the location that corresponds to the first event in the list of events, displaying the information user interface for the first event.

7. The method of claim 1, wherein the image-sharing user interface includes a list of user information entries for at least a subset of users that have joined the first event, wherein a user information entry includes information associated with a respective user that has joined the first event.

8. The method of claim 7, including:
   detecting an input at a location of a respective user in the list of user information entries, and
   in response to detecting the input at the location of the respective user in the list of user information entries, ceasing to display images from users other than the respective user.

9. The method of claim 1, including:
   displaying a representation of the first region in the information user interface for the first event;
   in accordance with a determination that the current location of the first electronic device is within the first region associated with the first event, displaying a representation of the first electronic device within the representation of the first region associated with the first event; and
   in accordance with a determination that the current location of the first electronic device is not within the first region associated with the first event, displaying the representation of the first electronic device outside of the first region associated with the first event.

10. A non-transitory computer-readable storage medium storing one or more programs, the one or more programs comprising instructions, which when executed by a first electronic device with a display, cause the device to:
   determine a current location of the first electronic device;
   in accordance with a determination that the current location of the first electronic device is within a first region associated with a first event, display a control for joining the first event in a selectable state in an information user interface for the first event;
   in accordance with a determination that the current location of the first electronic device is outside of the first region and within a second region associated with the first event, wherein the second region is larger than the first region and includes the first region, display the control for joining the first event in a non-selectable state in the information user interface for the first event;
   while the information user interface for the first event is displayed, detect an input at a location that corresponds to the control for joining the first event; and,
   in response to detecting the input at the control for joining the first event:
     in accordance with a determination that the control for joining the first event is in the selectable state:
       replace display of the information user interface for the first event with display of an image-sharing user interface for the first event;
       add the first electronic device to the first event; and
       receive, at the first electronic device, a plurality of images that correspond to the first event, wherein at least a subset of the plurality of images that corresponds to the first event are captured by a second device, distinct from the first electronic device, that has joined the first event; and
       display at least some of the plurality of images in the image-sharing user interface for the first event; and
     in accordance with a determination that the control for joining the first event is in the non-selectable state, forgo adding the first electronic device to the first event.

11. The computer-readable storage medium of claim 10, wherein the plurality of images include images that the second device captured outside of the first region and inside the second region.

12. The computer-readable storage medium of claim 10, wherein the plurality of images include images that the second device captured outside of the second region.

13. The computer-readable storage medium of claim 10, wherein the one or more programs include instructions that cause the device to: in response to detecting the input at the control for joining the first event, in accordance with the determination that the control for joining the first event is in the non-selectable state, forgo replacing display of the information user interface for the first event with the image-sharing user interface for the first event.

14. The computer-readable storage medium of claim 10, wherein the one or more programs include instructions that cause the device to: in response to detecting the input at the control for joining the first event, in accordance with the determination that the control for joining the first event is in the non-selectable state, forgo receiving the plurality of images that correspond to the first event.

15. The computer-readable storage medium of claim 10, wherein the one or more programs include instructions that cause the device to:
   prior to displaying the information user interface for the first event, display an event list user interface that includes a list of events,
   in accordance with a determination that the current location of the first electronic device is within the second region associated with the first event, display the first event in the list of events;
   display at least one other event in the list of events, wherein the current location of the electronic device is within a region that corresponds to the at least one other event;
   detect input at a location that corresponds to the first event in the list of events; and
   in response to detecting the input at the location that corresponds to the first event in the list of events, display the information user interface for the first event.

16. The computer-readable storage medium of claim 10, wherein the image-sharing user interface includes a list of user information entries for at least a subset of users that have joined the first event, wherein a user information entry includes information associated with a respective user that has joined the first event.

17. The computer-readable storage medium of claim 10, wherein the one or more programs include instructions that cause the device to:
   detect an input at a location of a respective user in the list of user information entries, and
   in response to detecting the input at the location of the respective user in the list of user information entries, cease to display images from users other than the respective user.

18. The computer-readable storage medium of claim 10, wherein the one or more programs include instructions that cause the device to:
   display a representation of the first region and in the information user interface for the first event;
   in accordance with a determination that the current location of the first electronic device is within the first region associated with the first event, display a representation of the first electronic device within the representation of the first region associated with the first event; and in accordance with a determination that the current location of the first electronic device is not within the first region associated with the first event, display the representation of the first electronic device outside of the first region associated with the first event.

19. A first electronic device, comprising:
a display;
one or more processors;
memory; and
one or more programs, wherein the one or more programs are stored in the memory and configured to be executed by the one or more processors, the one or more programs including instructions for:
   determining a current location of the first electronic device;
   in accordance with a determination that the current location of the first electronic device is within a first region associated with a first event, displaying a control for joining the first event in a selectable state in an information user interface for the first event;
   in accordance with a determination that the current location of the first electronic device is outside of the first region and within a second region associated with the first event, wherein the second region is larger than the first region and includes the first region, displaying the control for joining the first event in a non-selectable state in the information user interface for the first event;
   while the information user interface for the first event is displayed, detecting an input at a location that corresponds to the control for joining the first event; and,
   in response to detecting the input at the control for joining the first event:
      in accordance with a determination that the control for joining the first event is in the selectable state:
         replacing display of the information user interface for the first event with display of an image-sharing user interface for the first event;
         adding the first electronic device to the first event; and
         receiving, at the first electronic device, a plurality of images that correspond to the first event, wherein at least a subset of the plurality of images that corresponds to the first event are captured by a second device, distinct from the first electronic device, that has joined the first event; and
         displaying at least some of the plurality of images in the image-sharing user interface for the first event; and
      in accordance with a determination that the control for joining the first event is in the non-selectable state, forgoing adding the first electronic device to the first event.

20. The electronic device of claim 19, wherein the plurality of images include images that the second device captured outside of the first region and inside the second region.

21. The electronic device of claim 19, wherein the plurality of images include images that the second device captured outside of the second region.

22. The electronic device of claim 19, wherein the one or more programs include instructions for: in response to detecting the input at the control for joining the first event, in accordance with the determination that the control for joining the first event is in the non-selectable state, forgo replacing display of the information user interface for the first event with the image-sharing user interface for the first event.

23. The electronic device of claim 19, wherein the one or more programs include instructions for: in response to detecting the input at the control for joining the first event, in accordance with the determination that the control for joining the first event is in the non-selectable state, forgoing receiving the plurality of images that correspond to the first event.

24. The electronic device of claim 19, wherein the one or more programs include instructions for:
   prior to displaying the information user interface for the first event, displaying an event list user interface that includes a list of events,
   in accordance with a determination that the current location of the first electronic device is within the second region associated with the first event, displaying the first event in the list of events;
   displaying at least one other event in the list of events, wherein the current location of the electronic device is within a region that corresponds to the at least one other event;
   detecting input at a location that corresponds to the first event in the list of events; and
   in response to detecting the input at the location that corresponds to the first event in the list of events, displaying the information user interface for the first event.

25. The electronic device of claim 19, wherein the image-sharing user interface includes a list of user information entries for at least a subset of users that have joined the first event, wherein a user information entry includes information associated with a respective user that has joined the first event.

26. The electronic device of claim 19, wherein the one or more programs include instructions for:
   detecting an input at a location of a respective user in the list of user information entries, and
   in response to detecting the input at the location of the respective user in the list of user information entries, ceasing to display images from users other than the respective user.

27. The electronic device of claim 19, wherein the one or more programs include instructions for:
   displaying a representation of the first region and in the information user interface for the first event;
   in accordance with a determination that the current location of the first electronic device is within the first region associated with the first event, displaying a representation of the first electronic device within the representation of the first region associated with the first event; and
   in accordance with a determination that the current location of the first electronic device is not within the first region associated with the first event, displaying the representation of the first electronic device outside of the first region associated with the first event.

* * * * *